(12) United States Patent
Paluri et al.

(10) Patent No.: US 12,143,617 B2
(45) Date of Patent: Nov. 12, 2024

(54) METHOD AND DEVICE FOR ENCODING/DECODING IMAGE USING SUB-PICTURE, AND BIT STREAM TRANSMISSION METHOD

(71) Applicant: LG Electronics Inc., Seoul (KR)

(72) Inventors: Seethal Paluri, Seoul (KR); Jie Zhao, Seoul (KR); Seung Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/686,124

(22) Filed: Mar. 3, 2022

(65) Prior Publication Data

US 2022/0272370 A1  Aug. 25, 2022

Related U.S. Application Data

(63) Continuation of application No. PCT/KR2020/011836, filed on Sep. 3, 2020.

(60) Provisional application No. 62/904,671, filed on Sep. 23, 2019, provisional application No. 62/895,484, filed on Sep. 3, 2019.

(51) Int. Cl.
*H04N 19/46* (2014.01)
*H04N 19/132* (2014.01)
*H04N 19/14* (2014.01)
*H04N 19/176* (2014.01)

(52) U.S. Cl.
CPC ........... *H04N 19/46* (2014.11); *H04N 19/132* (2014.11); *H04N 19/14* (2014.11); *H04N 19/176* (2014.11)

(58) Field of Classification Search
None
See application file for complete search history.

(56) References Cited

U.S. PATENT DOCUMENTS

| 10,075,729 | B2 | 9/2018 | Wang et al. |
| 10,341,685 | B2 | 7/2019 | Yu et al. |
| 2015/0195574 | A1 | 7/2015 | Yu et al. |
| 2021/0044838 | A1* | 2/2021 | Chen .................... H04N 19/119 |

(Continued)

FOREIGN PATENT DOCUMENTS

| CN | 104756495 A | 7/2015 |
| CN | 105556965 A | 5/2016 |
| WO | WO 2017/171438 A1 | 10/2017 |

(Continued)

OTHER PUBLICATIONS

Bross et al. "VVC (Draft 6) JVET-O2001-vE" (Year: 2019).*

(Continued)

*Primary Examiner* — Mohammed Jebari
(74) *Attorney, Agent, or Firm* — Fish & Richardson P.C.

(57) ABSTRACT

An image encoding/decoding method and apparatus are provided. An image decoding method performed by an image decoding apparatus may comprise obtaining, from a picture parameter set, a first signaling flag specifying whether an identifier of a subpicture splitting a current picture is signaled using the picture parameter set, obtaining identifier information of the subpicture from the picture parameter set, based on the first signaling flag specifying that the identifier of the subpicture is signaled using the picture parameter set, and decoding the current picture by decoding a current subpicture identified based on the identifier information.

4 Claims, 20 Drawing Sheets

(56) References Cited

U.S. PATENT DOCUMENTS

2022/0141488 A1* 5/2022 He .................... H04N 19/70 375/240.12

FOREIGN PATENT DOCUMENTS

WO WO 2018/221368 A1 12/2018
WO WO 2019/145262 A1 8/2019

OTHER PUBLICATIONS

U.S. Appl. No. 62/889,068 of (US 20210044838).*

Boyce & Xu, "Sub-pictures and sub-picture sets with level derivation," JVET-O0555-v1, Presented at Joint Video Experts Team (JVET) of ITU-T SG 16 WP 3 and ISO/IEC JTC 1/SC 29/WG 11, 15th Meeting: Gothenburg, SE, Jul. 3-12, 2019, 11 pages.

Bross et al., "Versatile Video Coding (Draft 6)," JVET-O2001, Presented at Joint Video Experts Team (JVET) of ITU-T SG 16 WP 3 and ISO/IEC JTC 1/SC 29/WG 11, 15th Meeting: Gothenburg, SE, Jul. 3-12, 2019, 455 pages.

He & Hamza, "AHG12/AHG17: On Sub-picture parameter set," JVET-N0099, Presented at Joint Video Experts Team (JVET) of ITU-T SG 16 WP 3 and ISO/IEC JTC 1/SC 29/WG 11, 14th Meeting: Geneva, CH, Mar. 19-27, 2019, 7 pages.

Jingya et al., "AHG12: Modification for subpicture," JVET-P0171-v1, Joint Video Experts Team (JVET) of ITU-T SG 16 WP 3 and ISO/IEC JTC 1/SC 29/WG 11, 16$^{th}$ Meeting: Geneva, CH, Oct. 1-11, 2019, 6 pages.

Notice of Allowance in Korean Appln. No. 10-2022-7007565, mailed on May 27, 2024, 10 pages (with English translation).

Office Action in Chinese Appln. No. 202080074435.4, mailed on Sep. 20, 2024, 8 pages.

* cited by examiner

FIG. 4
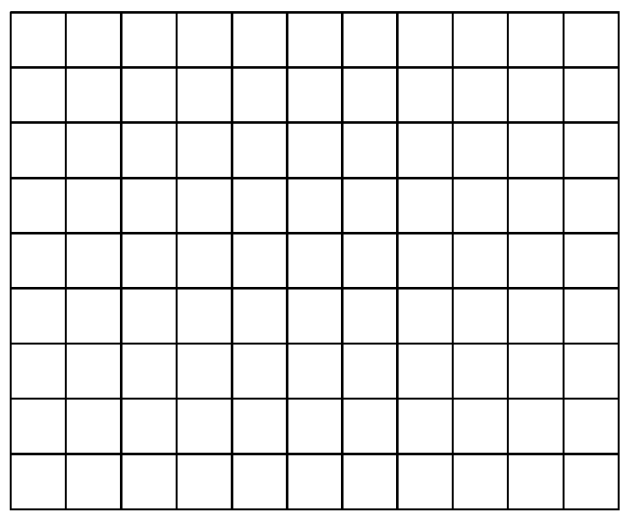
FIG. 5
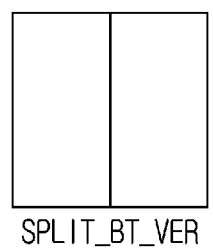 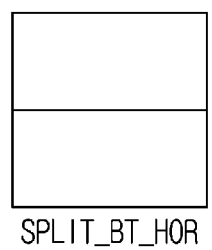 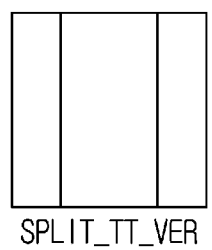 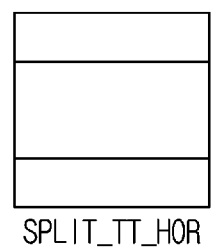
SPLIT_BT_VER      SPLIT_BT_HOR      SPLIT_TT_VER      SPLIT_TT_HOR

FIG. 7

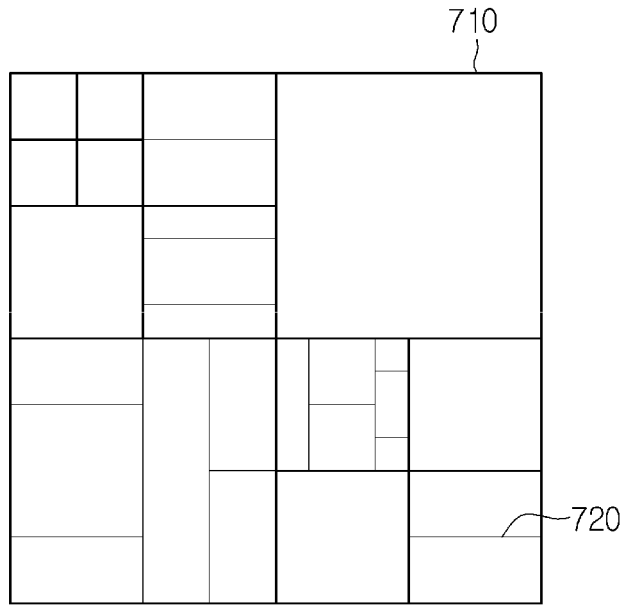

FIG. 8

| seq_parameter_set_rbsp( ) { | Descriptor |
|---|---|
|   sps_decoding_parameter_set_id | u(4) |
| ... | |
|   pic_width_max_in_luma_samples | ue(v) |
|   pic_height_max_in_luma_samples | ue(v) |
|   subpics_present_flag | u(1) |
|   if( subpics_present_flag ) { | |
|     max_grid_idxs_minus1 | u(8) |
|     subpic_grid_col_width_minus1 | u(v) |
|     subpic_grid_row_height_minus1 | u(v) |
|     for( i = 0; i < NumSubPicGridRows; i++ ) | |
|       for( j = 0; j < NumSubPicGridCols; j++ ) | |
|         subpic_grid_idx[ i ][ j ] | u(v) |
|     for( i = 0; i <= NumSubPics; i++ ) { | |
|       subpic_treated_as_pic_flag[ i ] | u(1) |
|       loop_filter_across_subpic_enabled_flag[ i ] | u(1) |
|     } | |
|   } | |
| .... | |

FIG. 9

```
NumSubPics = 0
for( i = 0; i .< NumSubPicGridRows; i++ ) {
    for( j = 0; j < NumSubPicGridCols; j++ ) {
        if( i == 0)
            SubPicTop[ subpic_grid_idx[ i ][ j ] ] = 0
        else if( subpic_grid_idx[ i ][ j ] != subpic_grid_idx[ i − 1 ][ j ] ) {
            SubPicTop[ subpic_grid_idx[ i ][ j ] ] = i
            SubPicHeight[ subpic_grid_idx[ i − 1 ][ j ] ] = i − SubPicTop[ subpic_grid_idx[ i − 1 ][ j ]
        }
        if( j == 0 )
            SubPicLeft[ subpic_grid_idx[ i ][ j ] ] = 0
        else if(subpic_grid_idx[ i ][ j ] != subpic_grid_idx[ i ][ j − 1 ] ) {
            SubPicLeft[ subpic_grid_idx[ i ][ j ] ] = j
            SubPicWidth[ subpic_grid_idx[ i ][ j ] ] = j − SubPicLeft[ subpic_grid_idx[ i ][ j − 1 ] ]
        }
        if( i == NumSubPicGridRows − 1 )
            SubPicHeight[ subpic_grid_idx[ i ][ j ] ] = i − SubPicTop[ subpic_grid_idx[ i − 1 ][ j ] ] + 1  if( j == NumSubPicGridRows − 1 )
            SubPicWidth[ subpic_grid_idx[ i ][ j ] ] = j − SubPicLeft[ subpic_grid_idx[ i ][ j − 1 ] ] + 1
        if( subpic_grid_idx[ i ][ j ] > NumSubPics )
            NumSubPics = subpic_grid_idx[ i ][ j ]
    }
}
```

FIG. 12

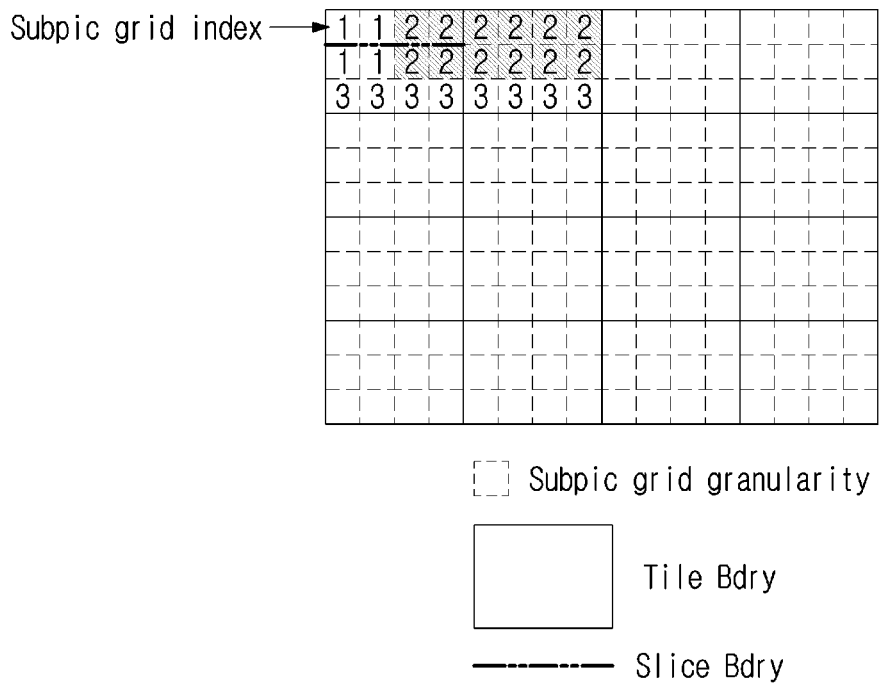

FIG. 13

| seq_parameter_set_rbsp( ) { | Descriptor |
|---|---|
| sps_decoding_parameter_set_id | u(4) |
| sps_video_parameter_set_id | u(4) |
| sps_max_sub_layers_minus1 | u(3) |
| sps_reserved_zero_5bits | u(5) |
| profile_tier_level( sps_max_sub_layers_minus1 ) | |
| gdr_enabled_flag | u(1) |
| sps_seq_parameter_set_id | ue(v) |
| chroma_format_idc | ue(v) |
| if( chroma_format_idc == 3 ) | |
|    separate_colour_plane_flag | u(1) |
| pic_width_max_in_luma_samples | ue(v) |
| pic_height_max_in_luma_samples | ue(v) |
| ~~subpics_present_flag~~ | ~~u(1)~~ |
| ~~if( subpics_present_flag ) {~~ | |
| ~~  max_subpics_minus1~~ | ~~u(8)~~ |
| ~~  subpic_grid_col_width_minus1~~ | ~~u(v)~~ |
| ~~  subpic_grid_row_height_minus1~~ | ~~u(v)~~ |
| ~~  for( i = 0; i < NumSubPicGridRows; i++ )~~ | |
| ~~    for( j = 0; j < NumSubPicGridCols; j++ )~~ | |
| ~~      subpic_grid_idx[ i ][ j ]~~ | ~~u(v)~~ |
| ~~  for( i = 0; i <= NumSubPics; i++ ) {~~ | |
| ~~    subpic_treated_as_pic_flag[ i ]~~ | ~~u(1)~~ |
| ~~    loop_filter_across_subpic_enabled_flag[ i ]~~ | ~~u(1)~~ |
| ~~  }~~ | |
| ~~}~~ | |
| bit_depth_luma_minus8 | ue(v) |
| bit_depth_chroma_minus8 | ue(v) |
| min_qp_prime_ts_minus4 | ue(v) |

| pic_parameter_set_rbsp( ) { | Descriptor |
|---|---|
|   pps_pic_parameter_set_id | ue(v) |
|   pps_seq_parameter_set_id | ue(v) |
|   pic_width_in_luma_samples | ue(v) |
| .... | |
|   output_flag_present_flag | u(1) |
|   pps_subpics_present_flag | u(1) |
|   if(pps_subpics_present_flag) | |
|     max_subpics_minus1 | u(8) |
|   if( !single_tile_in_pic_flag ) { | |
|     ... | ... |
|     single_brick_per_slice_flag | u(1) |
|     if( !single_brick_per_slice_flag ) | |
|       rect_slice_flag | u(1) |
|     if( rect_slice_flag && !single_brick_per_slice_flag ) { | |
|       num_slices_in_pic_minus1 | ue(v) |
|       bottom_right_brick_idx_length_minus1 | ue(v) |
|       for( i = 0; i < num_slices_in_pic_minus1; i++ ) { | |
|         bottom_right_brick_idx_delta[ i ] | u(v) |
|         brick_idx_delta_sign_flag[ i ] | u(1) |
|       } | |
|     } | |
|     loop_filter_across_bricks_enabled_flag | u(1) |
|     if( loop_filter_across_bricks_enabled_flag ) | |
|       loop_filter_across_slices_enabled_flag | u(1) |
|   } | |
|   if( rect_slice_flag ) { | |
|     signalled_slice_id_flag | u(1) |
|     if( signalled_slice_id_flag || pps_subpics_present_flag ) { | |
|       signalled_slice_id_length_minus1 | ue(v) |
|       for( i = 0; i <= num_slices_in_pic_minus1; i++ ) | |
|         slice_id[ i ] | u(v) |
|         slice_to_subpic_id[ i ] | u(v) |
|       } | |
|     } | |
|   .... | |
|   if( pps_extension_flag ) | |
|     while( more_rbsp_data( ) ) | |
|       pps_extension_data_flag | u(1) |
|   rbsp_trailing_bits( ) | |
| } | |

FIG. 16

| general_constraint_info( ) { | Descriptor |
|---|---|
|   general_progressive_source_flag | u(1) |
|   ... | |
| 1610 —   no_subpictures_constraint_flag | u(1) |
|   ... | |

FIG. 17

| seq_parameter_set_rbsp( ) { | Descriptor |
|---|---|
|   sps_decoding_parameter_set_id | u(4) |
|   ... | |
|   sps_seq_parameter_set_id | ue(v) |
|   ... | |
|   subpics_present_flag | u(1) |
|   if( subpics_present_flag ) { | |
|     max_subpics_minus1 | u(8) |
|     uniform_subpic_grid_flag | u(1) |
|     if( uniform_subpic_grid_flag ) { | |
|       subpic_grid_col_width_minus1 | u(v) |
|       subpic_grid_row_height_minus1 | u(v) |
|     }else { | |
|       num_subpic_grid_col_minus1 | ue(v) |
|       num_subpic_grid_row_minus1 | ue(v) |
|       for( i = 0; i < NumSubPicGridRows; i++ ) | |
|         subpic_grid_row_height_minus1[ i ] | ue(v) |
|       for( i = 0; i < NumSubPicGridCols; i++ ) | |
|         subpic_grid_col_width_minus1[ i ] | ue(v) |
|     } | |
|     for( i = 0; i < NumSubPicGridRows; i++ ) | |
|       for( j = 0; j < NumSubPicGridCols; j++ ) | |
|         subpic_grid_idx[ i ][ j ] | u(v) |
|     for( i = 0; i <= NumSubPics; i++ ) { | |
|       subpic_treated_as_pic_flag[ i ] | u(1) |
|       loop_filter_across_subpic_enabled_flag[ i ] | u(1) |
|     } | |
|   } | |
|   ... | |
| } | |

FIG. 18

```
SubPicIdx = CtbToSubPicIdx[ CtbAddrBsToRs[ FirstCtbAddrBs[ SliceBrickIdx[ 0 ] ] ] ]
if( subpic_treated_as_pic_flag[ SubPicIdx ] ) { if(uniform_subpic_grid_flag){
        SubPicLeftBoundaryPos = SubPicLeft[ SubPicIdx ] * ( subpic_grid_col_width_minus1 + 1 ) * 4
        SubPicRightBoundaryPos = ( SubPicLeft[ SubPicIdx ] + SubPicWidth[ SubPicIdx ] ) * ( subpic_grid_col_width_minus1 + 1 ) * 4
        SubPicTopBoundaryPos = SubPicTop[ SubPicIdx ] * ( subpic_grid_row_height_minus1 + 1 )* 4
        SubPicBotBoundaryPos = ( SubPicTop[ SubPicIdx ] + SubPicHeight[ SubPicIdx ] ) * ( subpic_grid_row_height_minus1 + 1 ) * 4

} else {
        SubPicLeftBoundaryPos = SubPicLeft[ SubPicIdx ] * ( subpic_grid_col_width_minus1[ SubPicIdx ]+ 1 ) * 4
        SubPicRightBoundaryPos = ( SubPicLeft[ SubPicIdx ] + SubPicWidth[ SubPicIdx ] ) * ( subpic_grid_col_width_minus1 [SubPicIdx] + 1 ) * 4
        SubPicTopBoundaryPos = SubPicTop[ SubPicIdx ] * ( subpic_grid_row_height_minus1[SubPicIdx] + 1 )* 4
        SubPicBotBoundaryPos = ( SubPicTop[ SubPicIdx ] + SubPicHeight[ SubPicIdx ] ) * ( subpic_grid_row_height_minus1[SubPicIdx] + 1 ) * 4
    }
}
```

FIG. 19

```
for( ctbAddrRs = 0; ctbAddrRs < PicSizeInCtbsY; ctbAddrRs++ ) {
        posX = ctbAddrRs % PicWidthInCtbsY * CtbSizeY
        posY = ctbAddrRs / PicWidthInCtbsY * CtbSizeY
        CtbToSubPicIdx[ ctbAddrRs ] = -1
        for( i = 0; CtbToSubPicIdx[ ctbAddrRs ] < 0 && i < NumSubPics; i++ ) {
        if(uniform_subpic_grid_flag) {
                if( ( posX >= SubPicLeft[ i ] * ( subpic_grid_col_width_minus1 + 1 ) * 4 ) &&
                    ( posX < ( SubPicLeft[ i ] + SubPicWidth[ i ] ) * ( subpic_grid_col_width_minus1 + 1 ) * 4 ) &&
                    ( posY >= SubPicTop[ i ] * ( subpic_grid_row_height_minus1 + 1 ) * 4 ) &&
                    ( posY < ( SubPicTop[ i ] + SubPicHeight[ i ] ) * ( subpic_grid_row_height_minus1 + 1 ) * 4 ) )
                        CtbToSubPicIdx[ ctbAddrRs ] = I
        }
        else {
                if( ( posX >= SubPicLeft[ i ] * ( subpic_grid_col_width_minus1[i] + 1 ) * 4 ) &&
                    ( posX < ( SubPicLeft[ i ] + SubPicWidth[ i ] ) * ( subpic_grid_col_width_minus1[i] + 1 ) * 4 ) &&
                    ( posY >= SubPicTop[ i ] *  ( subpic_grid_row_height_minus1[i] + 1 ) * 4 ) &&
                    ( posY < ( SubPicTop[ i ] + SubPicHeight[ i ] ) *  ( subpic_grid_row_height_minus1[i] + 1 ) * 4 ) )
                        CtbToSubPicIdx[ ctbAddrRs ] = i
        }
        }
}
```

FIG. 20

| seq_parameter_set_rbsp( ) { | Descriptor |
|---|---|
| sps_decoding_parameter_set_id | u(4) |
| ... | |
| subpics_present_flag | u(1) |
| if( subpics_present_flag ) { | |
| max_grid_idxs_minus1 | u(8) |
| grid_spacing_minus4 | u(v) |
| subpic_grid_col_width_minus1 | u(v) |
| subpic_grid_row_height_minus1 | u(v) |
| for( i = 0; i < NumSubPicGridRows; i++ ) | |
| for( j = 0; j < NumSubPicGridCols; j++ ) | |
| subpic_grid_idx[ i ][ j ] | u(v) |
| for( i = 0; i <= NumSubPics; i++ ) { | |
| subpic_treated_as_pic_flag[ i ] | u(1) |
| loop_filter_across_subpic_enabled_flag[ i ] | u(1) |
| } | |
| } | |
| .... | |

(2010 points to the middle rows of the table)

FIG. 21

```
NumSubPics = 0
for( i = 0; i < NumSubPicGridRows; i++ ) {
        for( j = 0; j < NumSubPicGridCols; j++ ) {
            if ( i = = 0)
                SubPicTop[ subpic_grid_idx[ i ][ j ] ] = 0
            else if( subpic_grid_idx[ i ][ j ]  !=  subpic_grid_idx[ i - 1 ][ j ] ) {
                SubPicTop[ subpic_grid_idx[ i ][ j ] ] = i
                SubPicHeight[ subpic_grid_idx[ i - 1][ j ] ] = i - SubPicTop[ subpic_grid_idx[ i - 1 ][ j ] ]
            }
            if ( j = = 0)
                SubPicLeft[ subpic_grid_idx[ i ][ j ] ] = 0
            else if (subpic_grid_idx[ i ][ j ] != subpic_grid_idx[ i ][ j - 1 ] ) {
                SubPicLeft[ subpic_grid_idx[ i ][ j ] ] = j
                SubPicWidth[ subpic_grid_idx[ i ][ j-1 ] ] = j - SubPicLeft[ subpic_grid_idx[ i ][ j - 1 ] ]
            }
        if ( i = = NumSubPicGridRows - 1)  {
            if ( subpic_grid_idx[ i ][ j ]  ==  subpic_grid_idx[ i - 1 ][ j ]) {
                        SubPicHeight[ subpic_grid_idx[ i ][ j ] ] = i - SubPicTop[ subpic_grid_idx[ i - 1 ][ j ] ] + 1
            } else{
              SubPicHeight[ subpic_grid_idx[ i ][ j ] ] = 1
            }
        }
        if (j = = NumSubPicGridCols - 1)  {
            if (subpic_grid_idx[ i ][ j ] == subpic_grid_idx[ i ][ j - 1 ]) {
                        SubPicWidth[ subpic_grid_idx[ i ][ j ] ] = j - SubPicLeft[ subpic_grid_idx[ i ][ j - 1 ] ] + 1
            }
            else {
              SubPicWidth[ subpic_grid_idx[ i ][ j ] ] = 1
            }
        }
        if( subpic_grid_idx[ i ][ j ] > NumSubPics)
                NumSubPics = subpic_grid_idx[ i ][ j ]
    }
}
```

FIG. 22

| seq_parameter_set_rbsp( ) { | Descriptor |
|---|---|
|   sps_decoding_parameter_set_id | u(4) |
| ... | |
|   sps_seq_parameter_set_id | ue(v) |
| ... | |
|   subpics_present_flag | u(1) |
|   if( subpics_present_flag ) { | |
|     max_subpics_minus1 | u(8) |
|   uniform_subpic_grid_flag | u(1) |
|   if( uniform_subpic_grid_flag ) { | |
|     subpic_grid_col_width_minus1 | u(v) |
|     subpic_grid_row_height_minus1 | u(v) |
|   }else { | |
|     num_subpic_grid_col_minus1 | ue(v) |
|     num_subpic_grid_row_minus1 | ue(v) |
|     for( i = 0; i < NumSubPicGridRows; i++ ) | |
|       subpic_grid_rows_height_minus1[ i ] | ue(v) |
|     for( i = 0; i < NumSubPicGridCols; i++ ) | |
|       subpic_grid_cols_width_minus1[ i ] | ue(v) |
|   } | |
|   for( i = 0; i < NumSubPicGridRows; i++ ) | |
|     for( j = 0; j < NumSubPicGridCols; j++ ) | |
|       subpic_grid_idx[ i ][ j ] | u(v) |
|   for( i = 0; i <= NumSubPics; i++ ) { | |
|     subpic_treated_as_pic_flag[ i ] | u(1) |
|     loop_filter_across_subpic_enabled_flag[ i ] | u(1) |
|   } | |
| } | |
| ... | |
| } | |

FIG. 23

```
SubPicIdx = CtbToSubPicIdx[ CtbAddrBsToRs[ FirstCtbAddrBs[ SliceBrickIdx[ 0 ] ] ] ]

if( subpic_treated_as_pic_flag[ SubPicIdx ] ) {
    if(uniform_subpic_grid_flag){
        SubPicLeftBoundaryPos = SubPicLeft[ SubPicIdx ] * ( subpic_grid_col_width_minus1 + 1 ) * 4
        SubPicRightBoundaryPos = ( SubPicLeft[ SubPicIdx ] + SubPicWidth[ SubPicIdx ] ) * ( subpic_grid_col_width_minus1 + 1 ) * 4
        SubPicTopBoundaryPos = SubPicTop[ SubPicIdx ] * ( subpic_grid_row_height_minus1 + 1 )* 4
        SubPicBotBoundaryPos = ( SubPicTop[ SubPicIdx ] + SubPicHeight[ SubPicIdx ] ) * ( subpic_grid_row_height_minus1 + 1 ) * 4
    } else {
        SubPicLeftBoundaryPos = SubPicLeft[ SubPicIdx ] * ( subpic_grid_cols_width_minus1[ SubPicIdx]+ 1 ) * 4
        SubPicRightBoundaryPos = ( SubPicLeft[ SubPicIdx ] + SubPicWidth[ SubPicIdx ] ) * ( subpic_grid_cols_width_minus1 [SubPicIdx] + 1 ) * 4
        SubPicTopBoundaryPos = SubPicTop[ SubPicIdx ] * ( subpic_grid_rows_height_minus1[SubPicIdx] + 1 )* 4
        SubPicBotBoundaryPos = ( SubPicTop[ SubPicIdx ] + SubPicHeight[ SubPicIdx ] ) * ( subpic_grid_rows_height_minus1[SubPicIdx] + 1 ) * 4
    }
}
```

FIG. 24

```
for( ctbAddrRs = 0; ctbAddrRs < PicSizeInCtbsY; ctbAddrRs++ ) {
    posX = ctbAddrRs % PicWidthInCtbsY * CtbSizeY
    posY = ctbAddrRs / PicWidthInCtbsY * CtbSizeY
    CtbToSubPicIdx[ ctbAddrRs ] = −1
    for( i = 0; CtbToSubPicIdx[ ctbAddrRs ] < 0 && i < NumSubPics; i++ ) {
    if(uniform_subpic_grid_flag) {
        if( ( posX >= SubPicLeft[ i ] * ( subpic_grid_col_width_minus1 + 1 ) * 4 ) &&
            ( posX < ( SubPicLeft[ i ] + SubPicWidth[ i ] ) *
                    ( subpic_grid_col_width_minus1 + 1 ) * 4 ) &&
            ( posY >= SubPicTop[ i ] *
                    ( subpic_grid_row_height_minus1 + 1 ) * 4 ) &&
            ( posY < ( SubPicTop[ i ] + SubPicHeight[ i ] ) *
                    ( subpic_grid_row_height_minus1 + 1 ) * 4 ) )
        CtbToSubPicIdx[ ctbAddrRs ] = i
    } else {
        if( ( posX >= SubPicLeft[ i ] * ( subpic_grid_cols_width_minus1[i] + 1 ) * 4 ) &&
            ( posX < ( SubPicLeft[ I ] + SubPicWidth[ I ] ) *
                    ( subpic_grid_cols_width_minus1[i] + 1 ) * 4 ) &&
            ( posY >= SubPicTop[ I ] *
                    ( subpic_grid_rows_height_minus1[i] + 1 ) * 4 ) &&
            ( posY < ( SubPicTop[ I ] + SubPicHeight[ I ] ) *
                    ( subpic_grid_rows_height_minus1[i] + 1 ) * 4 ) )
        CtbToSubPicIdx[ ctbAddrRs ] = 1
    }
}
```

FIG. 25

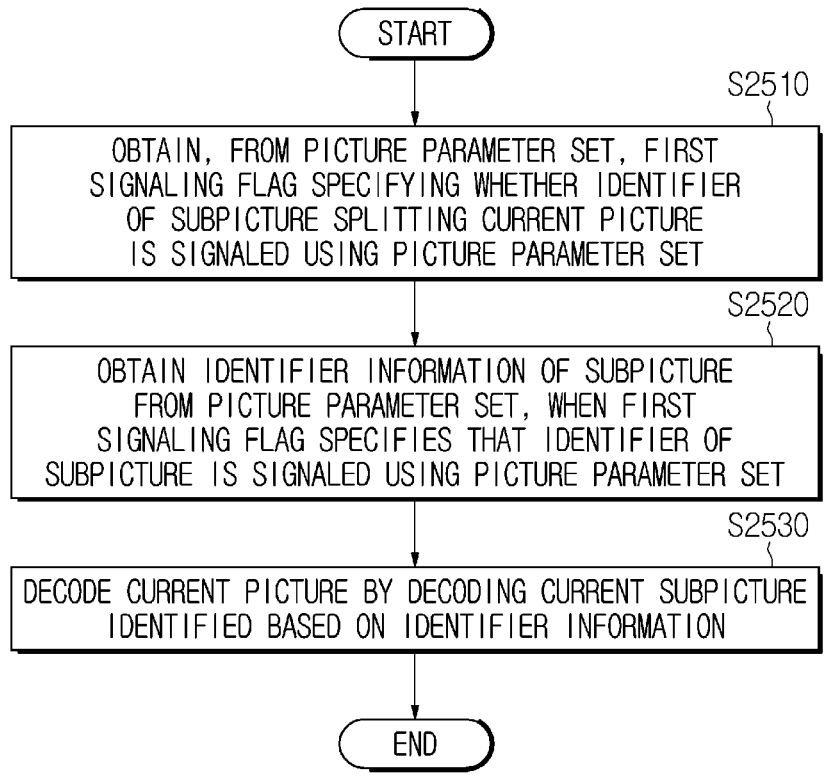

METHOD AND DEVICE FOR ENCODING/DECODING IMAGE USING SUB-PICTURE, AND BIT STREAM TRANSMISSION METHOD

CROSS-REFERENCE TO RELATED APPLICATIONS

Pursuant to 35 U.S.C. § 119(e), this application is a continuation of International Application PCT/KR2020/011836, with an international filing date of Sep. 3, 2020, which claims the benefit of U.S. Provisional Patent Application No. 62/895,484, filed Sep. 3, 2019, and U.S. Provisional Patent Application No. 62/904,671, filed on Sep. 23, 2019, the contents of which are hereby incorporated by reference herein in their entirety.

TECHNICAL FIELD

The present disclosure relates to an image encoding/decoding method and apparatus, and, more particularly, to an image encoding/decoding method and apparatus using a subpicture, and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

An object of the present disclosure is to provide an image encoding/decoding method and apparatus for improving encoding/decoding efficiency by efficiently signaling subpicture information.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may comprise obtaining, from a picture parameter set, a first signaling flag specifying whether an identifier of a subpicture splitting a current picture is signaled using the picture parameter set, obtaining identifier information of the subpicture from the picture parameter set, based on the first signaling flag specifying that the identifier of the subpicture is signaled using the picture parameter set, and decoding the current picture by decoding a current subpicture identified based on the identifier information.

An image decoding apparatus according to an aspect of the present disclosure may comprise a memory and at least one processor. The at least one processor may obtain, from a picture parameter set, a first signaling flag specifying whether an identifier of a subpicture splitting a current picture is signaled using the picture parameter set, obtain identifier information of the subpicture from the picture parameter set, based on the first signaling flag specifying that the identifier of the subpicture is signaled using the picture parameter set, and decode the current picture by decoding a current subpicture identified based on the identifier information.

An image encoding method performed by an image encoding apparatus according to an aspect of the present disclosure may comprise determining a subpicture by splitting a current picture, determining whether an identifier of the subpicture is signaled using a picture parameter set, and generating a picture parameter set comprising a first signaling flag specifying whether the identifier of the subpicture is signaled using the picture parameter set and identifier information of the subpicture, based on the identifier of the subpicture being signaled using the picture parameter set.

In addition, a transmission method according to another aspect of the present disclosure may transmit a bitstream generated by the image encoding apparatus or the image encoding method of the present disclosure.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus for improving encoding/decoding efficiency by efficiently signaling subpicture information.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 4 is a view showing a partitioning structure of an image according to an embodiment.

FIG. 5 is a view showing an embodiment of a partitioning type of a block according to a multi-type tree structure.

FIG. 7 is a view showing an embodiment in which a CTU is partitioned into multiple CUs.

FIG. 8 is a view illustrating an embodiment of syntax for signaling a subpicture syntax element in an SPS.

FIG. 9 is a view illustrating an embodiment of an algorithm for deriving a predetermined variable such as SubPicTop.

FIG. 12 is a view illustrating an embodiment of identifying a size and position of a subpicture using a subpicture grid index defined in an SPS.

FIG. 13 is a view illustrating an example of an SPS syntax structure in the present embodiment.

FIG. 15 is a view illustrating an example of a PPS syntax structure for subpicture index signaling of FIG. 12.

FIG. 16 is a view illustrating signaling of a syntax element specifying a constraint on pps_subpics_present_flag.

FIG. 17 is a view illustrating an SPS syntax structure for signaling a subpicture grid.

FIG. 18 is a view illustrating an embodiment of an algorithm for deriving a predetermined variable such as SubPicIdx.

FIG. 19 is a view illustrating an embodiment of an algorithm for deriving CtbToSubPicIdx.

FIG. 20 is a view illustrating an embodiment of an SPS syntax according to Embodiment 3.

FIG. 21 is a view illustrating a modified embodiment of the algorithm of FIG. 9 according to Embodiment 4.

FIGS. 22 to 24 are views illustrating modified embodiments of the examples of FIGS. 17 to 19 according to Embodiment 5.

FIGS. 25 to 26 are views illustrating operation of a decoding apparatus and an encoding apparatus according to an embodiment.

MODE FOR INVENTION

Figure 1:
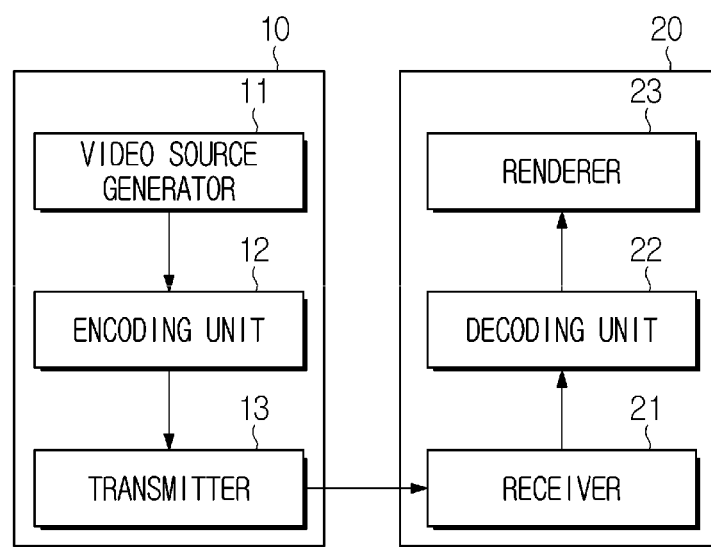
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
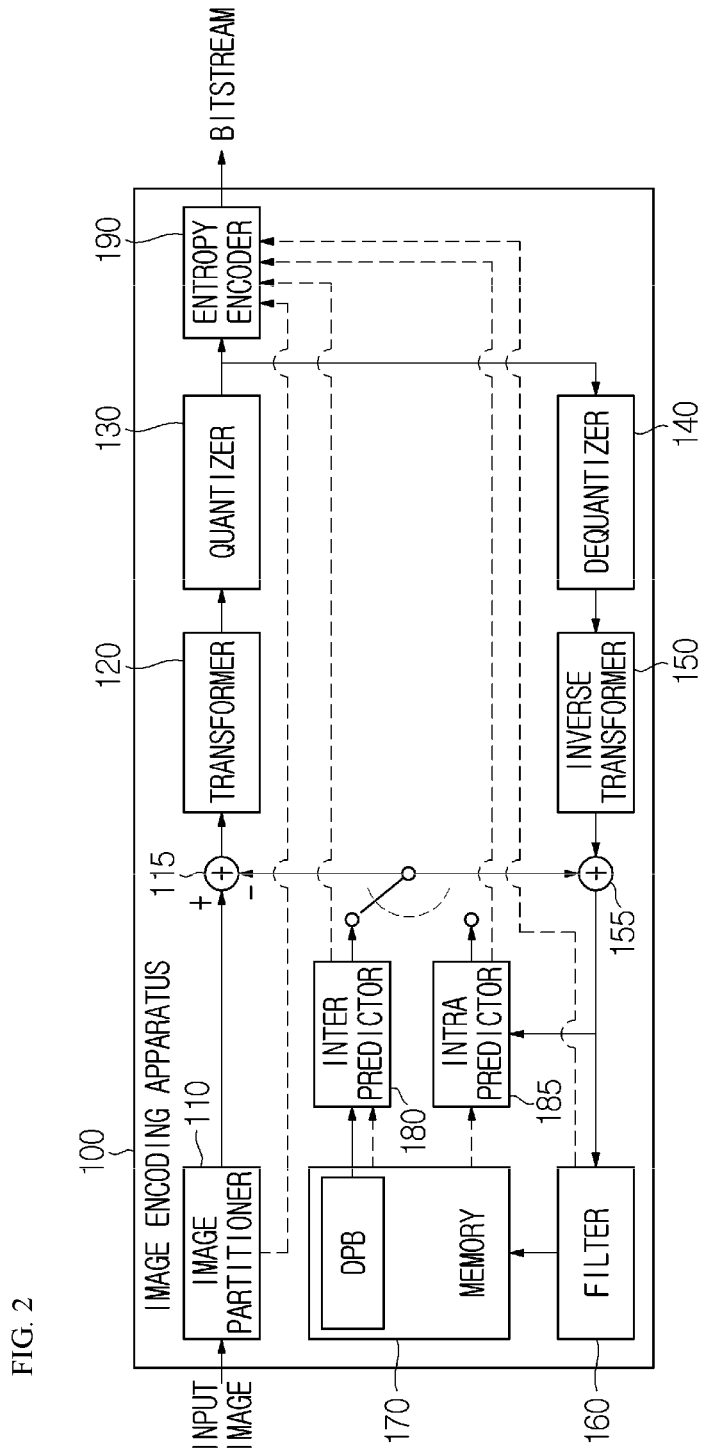
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information specifying which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
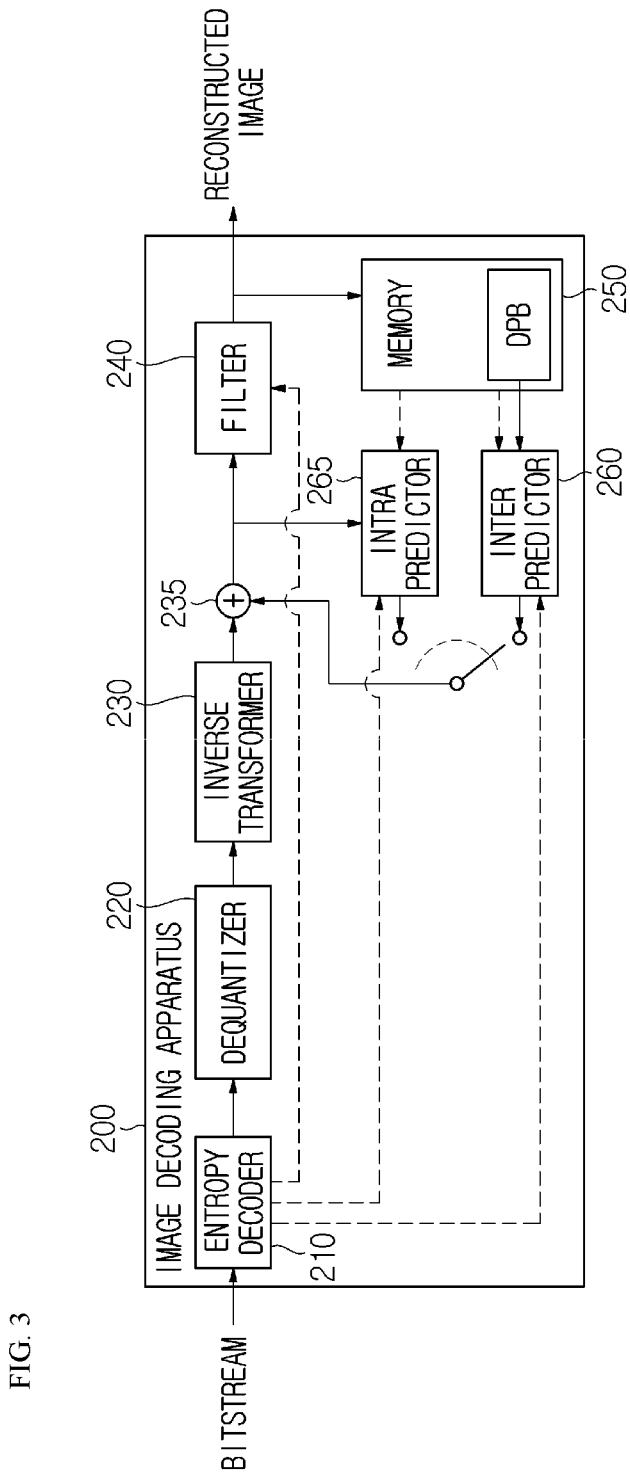
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information specifying a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Overview of Image Partitioning

The video/image coding method according to the present disclosure may be performed based on an image partitioning structure as follows. Specifically, the procedures of prediction, residual processing ((inverse) transform, (de)quantization, etc.), syntax element coding, and filtering, which will be described later, may be performed based on a CTU, CU (and/or TU, PU) derived based on the image partitioning structure. The image may be partitioned in block units and the block partitioning procedure may be performed in the image partitioner 110 of the encoding apparatus. The partitioning related information may be encoded by the entropy encoder 190 and transmitted to the decoding apparatus in the form of a bitstream. The entropy decoder 210 of the decoding apparatus may derive a block partitioning structure of the current picture based on the partitioning related information obtained from the bitstream, and based on this, may perform a series of procedures (e.g., prediction, residual processing, block/picture reconstruction, in-loop filtering, etc.) for image decoding.

Pictures may be partitioned into a sequence of coding tree units (CTUs). FIG. 4 shows an example in which a picture is partitioned into CTUs. The CTU may correspond to a coding tree block (CTB). Alternatively, the CTU may include a coding tree block of luma samples and two coding tree blocks of corresponding chroma samples. For example, for a picture that contains three sample arrays, the CTU may include an N×N block of luma samples and two corresponding blocks of chroma samples.

Overview of Partitioning of CTU

As described above, the coding unit may be acquired by recursively partitioning the coding tree unit (CTU) or the largest coding unit (LCU) according to a quad-tree/binary-tree/ternary-tree (QT/BT/TT) structure. For example, the CTU may be first partitioned into quadtree structures. Thereafter, leaf nodes of the quadtree structure may be further partitioned by a multi-type tree structure.

Partitioning according to quadtree means that a current CU (or CTU) is partitioned into equally four. By partitioning according to quadtree, the current CU may be partitioned into four CUs having the same width and the same height. When the current CU is no longer partitioned into the quadtree structure, the current CU corresponds to the leaf node of the quad-tree structure. The CU corresponding to the leaf node of the quadtree structure may be no longer partitioned and may be used as the above-described final coding unit. Alternatively, the CU corresponding to the leaf node of the quadtree structure may be further partitioned by a multi-type tree structure.

FIG. 5 is a view showing an embodiment of a partitioning type of a block according to a multi-type tree structure. Partitioning according to the multi-type tree structure may include two types of splitting according to a binary tree structure and two types of splitting according to a ternary tree structure.

The two types of splitting according to the binary tree structure may include vertical binary splitting (SPLIT_BT_VER) and horizontal binary splitting (SPLIT_BT_HOR). Vertical binary splitting (SPLIT_BT_VER) means that the current CU is split into equally two in the vertical direction. As shown in FIG. 4, by vertical binary splitting, two CUs having the same height as the current CU and having a width which is half the width of the current CU may be generated. Horizontal binary splitting (SPLIT_BT_HOR) means that the current CU is split into equally two in the horizontal direction. As shown in FIG. 5, by horizontal binary splitting, two CUs having a height which is half the height of the current CU and having the same width as the current CU may be generated.

Two types of splitting according to the ternary tree structure may include vertical ternary splitting (SPLIT_TT_VER) and horizontal ternary splitting (SPLIT_TT_HOR). In vertical ternary splitting (SPLIT_TT_VER), the current CU is split in the vertical direction at a ratio of 1:2:1. As shown in FIG. 5, by vertical ternary splitting, two CUs having the same height as the current CU and having a width which is ¼ of the width of the current CU and a CU having the same height as the current CU and having a width which is half the width of the current CU may be generated. In horizontal ternary splitting (SPLIT_TT_HOR), the current CU is split in the horizontal direction at a ratio of 1:2:1. As shown in FIG. 5, by horizontal ternary splitting, two CUs having a height which is ¼ of the height of the current CU and having the same width as the current CU and a CU having a height which is half the height of the current CU and having the same width as the current CU may be generated.

Figure 6:
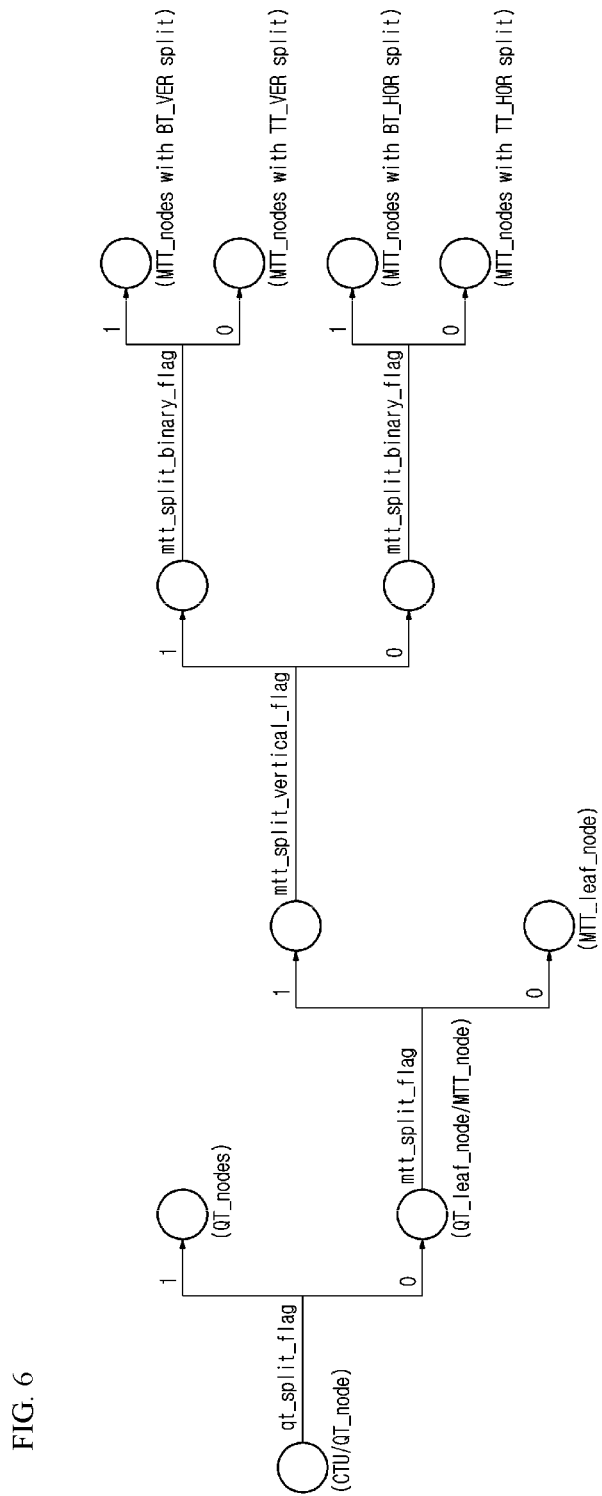
FIG. 6 is a view showing a signaling mechanism of block splitting information in a quadtree with nested multi-type tree structure according to the present disclosure.

FIG. 6 is a view showing a signaling mechanism of block splitting information in a quadtree with nested multi-type tree structure according to the present disclosure.

Here, the CTU is treated as the root node of the quadtree, and is partitioned for the first time into a quadtree structure. Information (e.g., qt_split_flag) specifying whether quadtree splitting is performed on the current CU (CTU or node (QT_node) of the quadtree) is signaled. For example, when qt_split_flag has a first value (e.g., "1"), the current CU may be quadtree-partitioned. In addition, when qt_split_flag has a second value (e.g., "0"), the current CU is not quadtree-partitioned, but becomes the leaf node (QT_leaf_node) of the quadtree. Each quadtree leaf node may then be further partitioned into multitype tree structures. That is, the leaf node of the quadtree may become the node (MTT_node) of the multi-type tree. In the multitype tree structure, a first flag (e.g., Mtt_split_cu_flag) is signaled to specify whether the current node is additionally partitioned. If the corresponding node is additionally partitioned (e.g., if the first flag is 1), a second flag (e.g., Mtt_split_cu_vertical_flag) may be signaled to specify the splitting direction. For example, the splitting direction may be a vertical direction if the second flag is 1 and may be a horizontal direction if the second flag is 0. Then, a third flag (e.g., Mtt_split_cu_binary_flag) may be signaled to specify whether the split type is a binary split type or a ternary split type. For example, the split type may be a binary split type when the third flag is 1 and may be a ternary split type when the third flag is 0. The node of the multi-type tree acquired by binary splitting or ternary splitting may be further partitioned into multi-type tree structures. However, the node of the multi-type tree may not be partitioned into quadtree structures. If the first flag is 0, the corresponding node of the multi-type tree is no longer split but becomes the leaf node (MTT_leaf_node) of the multi-type tree. The CU corresponding to the leaf node of the multi-type tree may be used as the above-described final coding unit.

Based on the mtt_split_cu_vertical_flag and the mtt_split_cu_binary_flag, a multi-type tree splitting mode (MttSplitMode) of a CU may be derived as shown in Table 1 below. In the following description, the multi-type tree splitting mode may be referred to as a multi-tree splitting type or splitting type.

TABLE 1

| MttSplitMode | mtt_split_cu_vertical_flag | mtt_split_cu_binary_flag |
| --- | --- | --- |
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

FIG. 7 is a view showing an example in which a CTU is partitioned into multiple CUs by applying a multi-type tree after applying a quadtree. In FIG. 7, bold block edges 710 represent quadtree partitioning and the remaining edges 720 represent multitype tree partitioning. The CU may correspond to a coding block (CB). In an embodiment, the CU may include a coding block of luma samples and two coding blocks of chroma samples corresponding to the luma samples. A chroma component (sample) CB or TB size may be derived based on a luma component (sample) CB or TB size according to the component ratio according to the color format (chroma format, e.g., 4:4:4, 4:2:2, 4:2:0 or the like) of the picture/image. In case of 4:4:4 color format, the chroma component CB/TB size may be set equal to be luma component CB/TB size. In case of 4:2:2 color format, the width of the chroma component CB/TB may be set to half the width of the luma component CB/TB and the height of the chroma component CB/TB may be set to the height of the luma component CB/TB. In case of 4:2:0 color format, the width of the chroma component CB/TB may be set to half the width of the luma component CB/TB and the height of the chroma component CB/TB may be set to half the height of the luma component CB/TB.

In an embodiment, when the size of the CTU is 128 based on the luma sample unit, the size of the CU may have a size from 128×128 to 4×4 which is the same size as the CTU. In one embodiment, in case of 4:2:0 color format (or chroma format), a chroma CB size may have a size from 64×64 to 2×2.

Meanwhile, in an embodiment, the CU size and the TU size may be the same. Alternatively, there may be a plurality of TUs in a CU region. The TU size generally represents a luma component (sample) transform block (TB) size.

The TU size may be derived based a largest allowable TB size maxTbSize which is a predetermined value. For example, when the CU size is greater than maxTbSize, a plurality of TUs (TBs) having maxTbSize may be derived from the CU and transform/inverse transform may be performed in units of TU (TB). For example, the largest allowable luma TB size may be 64×64 and the largest allowable chroma TB size may be 32×32. If the width or height of the CB partitioned according to the tree structure is larger than the largest transform width or height, the CB may be automatically (or implicitly) partitioned until the TB size limit in the horizontal and vertical directions is satisfied.

In addition, for example, when intra prediction is applied, an intra prediction mode/type may be derived in units of CU (or CB) and a neighboring reference sample derivation and prediction sample generation procedure may be performed in units of TU (or TB). In this case, there may be one or a plurality of TUs (or TBs) in one CU (or CB) region and, in this case, the plurality of TUs or (TBs) may share the same intra prediction mode/type.

Meanwhile, for a quadtree coding tree scheme with nested multitype tree, the following parameters may be signaled as SPS syntax elements from the encoding apparatus to the decoding apparatus. For example, at least one of a CTU size which is a parameter representing the root node size of a quadtree, MinQTSize which is a parameter representing the minimum allowed quadtree leaf node size, MaxBtSize which is a parameter representing the maximum allowed binary tree root node size, MaxTtSize which is a parameter representing the maximum allowed ternary tree root node size, MaxMttDepth which is a parameter representing the maximum allowed hierarchy depth of multi-type tree splitting from a quadtree leaf node, MinBtSize which is a parameter representing the minimum allowed binary tree leaf node size, or MinTtSize which is a parameter representing the minimum allowed ternary tree leaf node size is signaled.

As an embodiment of using 4:2:0 chroma format, the CTU size may be set to 128×128 luma blocks and two 64×64 chroma blocks corresponding to the luma blocks. In this case, MinOTSize may be set to 16×16, MaxBtSize may be set to 128×128, MaxTtSzie may be set to 64×64, MinBtSize and MinTtSize may be set to 4×4, and MaxMttDepth may be set to 4. Quadtree partitioning may be applied to the CTU to generate quadtree leaf nodes. The quadtree leaf node may be called a leaf QT node. Quadtree leaf nodes may have a size from a 16×16 size (e.g., the MinOTSize) to a 128×128 size (e.g., the CTU size). If the leaf QT node is 128×128, it may not be additionally partitioned into a binary tree/ternary tree. This is because, in this case, even if partitioned, it exceeds MaxBtsize and MaxTtszie (e.g., 64×64). In other cases, leaf QT nodes may be further partitioned into a multitype tree. Therefore, the leaf QT node is the root node for the multi-type tree, and the leaf QT node may have a multitype tree depth (mttDepth) 0 value. If the multitype tree depth reaches MaxMttdepth (e.g., 4), further partitioning may not be considered further. If the width of the multitype tree node is equal to MinBtSize and less than or equal to 2×MinTtSize, then no further horizontal partitioning may be considered. If the height of the multitype tree node is equal to MinBtSize and less than or equal to 2×MinTtSize, no further vertical partitioning may be considered. When partitioning is not considered, the encoding apparatus may skip signaling of partitioning information. In this case, the decoding apparatus may derive partitioning information with a predetermined value.

Meanwhile, one CTU may include a coding block of luma samples (hereinafter referred to as a "luma block") and two coding blocks of chroma samples corresponding thereto (hereinafter referred to as "chroma blocks"). The above-described coding tree scheme may be equally or separately applied to the luma block and chroma block of the current CU. Specifically, the luma and chroma blocks in one CTU may be partitioned into the same block tree structure and, in this case, the tree structure is represented as SINGLE_TREE. Alternatively, the luma and chroma blocks in one CTU may be partitioned into separate block tree structures, and, in this case, the tree structure may be represented as DUAL_TREE. That is, when the CTU is partitioned into dual trees, the block tree structure for the luma block and the block tree structure for the chroma block may be separately present. In this case, the block tree structure for the luma block may be called DUAL_TREE_LUMA, and the block tree structure for the chroma component may be called DUAL_TREE_CHROMA. For P and B slice/tile groups, luma and chroma blocks in one CTU may be limited to have the same coding tree structure. However, for I slice/tile groups, luma and chroma blocks may have a separate block tree structure from each other. If the separate block tree structure is applied, the luma CTB may be partitioned into CUs based on a particular coding tree structure, and the chroma CTB may be partitioned into chroma CUs based on another coding tree structure. That is, this means that a CU in an I slice/tile group, to which the separate block tree structure is applied, may include a coding block of luma components or coding blocks of two chroma components and a CU of a P or B slice/tile group may include blocks of three color components (a luma component and two chroma components).

Although a quadtree coding tree structure with a nested multitype tree has been described, a structure in which a CU is partitioned is not limited thereto. For example, the BT structure and the TT structure may be interpreted as a concept included in a multiple partitioning tree (MPT) structure, and the CU may be interpreted as being partitioned through the QT structure and the MPT structure. In an example where the CU is partitioned through a QT structure and an MPT structure, a syntax element (e.g., MPT split type) including information on how many blocks the leaf node of the QT structure is partitioned into and a syntax element (ex. MPT split mode) including information on which of vertical and horizontal directions the leaf node of the QT structure is partitioned into may be signaled to determine a partitioning structure.

In another example, the CU may be partitioned in a different way than the QT structure, BT structure or TT structure. That is, unlike that the CU of the lower depth is partitioned into ¼ of the CU of the higher depth according to the QT structure, the CU of the lower depth is partitioned into ½ of the CU of the higher depth according to the BT structure, or the CU of the lower depth is partitioned into ¼ or ½ of the CU of the higher depth according to the TT structure, the CU of the lower depth may be partitioned into ⅕, ⅓, ⅜, ⅗, ⅔, or ⅝ of the CU of the higher depth in some cases, and the method of partitioning the CU is not limited thereto.

The quadtree coding block structure with the multi-type tree may provide a very flexible block partitioning structure. Because of the partition types supported in a multi-type tree, different partition patterns may potentially result in the same coding block structure in some cases. In the encoding apparatus and the decoding apparatus, by limiting the occurrence of such redundant partition patterns, a data amount of partitioning information may be reduced.

Quantization/Dequantization

As described above, the quantizer of the encoding apparatus may derive quantized transform coefficients by applying quantization to transform coefficients, and the dequantizer of the encoding apparatus or the dequantizer of the decoding apparatus ma derive transform coefficients by applying dequantization to the quantized transform coefficients.

In encoding and decoding of moving image/still image, a quantization rate may be changed and a compression rate may be adjusted using the changed quantization rate. From an implementation point of view, in consideration of complexity, a quantization parameter (QP) may be used instead of directly using the quantization rate. For example, a quantization parameter having an integer value of 0 to 63 may be used and each quantization parameter value may correspond to an actual quantization rate. In addition, a quantization parameter $QP_Y$ for a luma component (luma sample) and a quantization parameter $QP_C$ for a chroma component (chroma sample) may be differently set.

In a quantization process, a transform coefficient C may be received as input and divided by quantization rate Qstep, and a quantized transform coefficient C' may be obtained based on this. In this case, in consideration of computational complexity, the quantization rate is multiplied by a scale to form an integer and shift operation may be performed by a value corresponding to the scale value. Based on the product of the quantization rate and the scale value, a quantization scale may be derived. That is, the quantization scale may be derived according to QP. By applying the quantization scale to the transform coefficient C, the quantized transform coefficient C' may be derived based on this.

A dequantization process is an inverse process of the quantization process, and the quantized transform coefficient C' may be multiplied by the quantization rate Qstep and a reconstructed transform coefficient C" may be obtained based on this. In this case, a level scale may be derived according to the quantization parameter, the level scale may be applied to the quantization transform coefficient C', and the reconstructed transform coefficient C" may be derived based on this. The reconstructed transform coefficient C" may be slightly different from the original transform coefficient C due to loss in the transform and/or quantization process. Accordingly, even the encoding apparatus may perform dequantization in the same manner as the decoding apparatus.

Meanwhile, adaptive frequency weighting quantization technology of adjusting a quantization strength according to frequency may apply. The adaptive frequency weighting quantization technology is a method of differently applying a quantization strength according to the frequency. In adaptive frequency weighting quantization, the quantization strength may differently apply according to the frequency using a predefined quantization scaling matrix. That is, the above-described quantization/dequantization process may be performed further based on the quantization scaling matrix. For example, a different quantization scaling matrix may be used according to a size of a current block and/or whether a prediction mode applying to the current block in order to generate a residual signal of the current block is inter prediction or intra prediction. The quantization scaling matrix may also be referred to as a quantization matrix or a scaling matrix. The quantization scaling matrix may be predefined. In addition, frequency quantization scale information for the quantization scaling matrix for frequency adaptive scaling may be constructed/encoded by the encoding apparatus and signaled to the decoding apparatus. The frequency quantization scale information may be referred to as quantization scaling information. The frequency quantization scale information may include scaling list data scaling_list_data. Based on the scaling list data, the (modified) quantization scaling matrix may be derived. In addition, the frequency quantization scale information may include present flag information specifying whether the scaling list data is present. Alternatively, when the scaling list data is signaled at a higher level (e.g., SPS), information specifying whether the scaling list data is modified at a lower level (e.g., PPS or tile group header, etc.) may be further included.

Overview of Subpicture

As described above, quantization and dequantization of a luma component and a chroma component may be performed based on a quantization parameter. In addition, one picture to be encoded may be split in units of a plurality of CTUs, slices, tiles or bricks, and, further, a picture may be split in units of a plurality of subpictures.

Within a picture, a subpicture may be encoded or decoded regardless of whether a preceding subpicture thereof is encoded or decoded. For example, different quantizations or different resolutions may apply to a plurality of subpictures.

Further, subpictures may be processed like individual pictures. For example, a picture to be encoded may be a projected picture or a packed picture in a 360-degree image/video or an omnidirectional image/video.

In this embodiment, a portion of a picture may be rendered or displayed based on a viewport of a user terminal (e.g., head mount display). Accordingly, in order to implement low latency, at least one subpicture covering the viewport among subpictures constructing one picture may be encoded or decoded preferentially or independently of the remaining subpictures.

The encoding result of the subpicture may be referred to as a sub-bitstream, a substream or simply a bitstream. The decoding apparatus may decode the subpicture from the sub-bitstream, the substream or the bitstream. In this case, a high level syntax (HLS) such as PPS, SPS, VPS and/or DPS (decoding parameter set) may be used to encode/decode the subpicture.

In the present disclosure, the high level syntax (HLS) may include at least one of the APS syntax, PPS syntax, SPS syntax, VPS syntax, DPS syntax or slice header syntax. For example, the APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to the whole video. For example, the DPS may include information/parameters related to concatenation of a coded video sequence (CVS).

Definition of Subpicture

A subpicture may construct a rectangular area of a coded picture. The size of the subpicture may be differently set within the picture. For all pictures belonging to one sequence, the size and position of a specific individual subpicture may be equally set. The individual subpicture sequence may be independently decoded. A tile and a slice (and CTBs) may be limited not to span across a subpicture boundary. To this end, the encoding apparatus may perform encoding such that subpictures are independently decoded. To this end, semantic constraints in a bitstream may be required. In addition, for each picture in one sequence, arrangement of tiles, slices and bricks in a subpicture may be differently constructed.

Subpicture Design Purpose

The subpicture design aims at abstraction or encapsulation of a range less than a picture level or greater than a slice or tile group level. Therefore, a VCL NAL unit of a motion constant tile set (MCTS) subset may be extracted from one VVC bitstream and is relocated to another VVC bitstream without difficulty such as modification at a VCL-level. Here, the MCTS is an encoding technology of enabling spatial and temporal independence between tiles. When the MCTS applies, information on tiles which are not included in the MCTS to which a current tile belongs cannot be referred to. When an image is split into MCTSs and encoded, independent transmission and decoding of the MCTS are possible.

Such a subpicture design has an advantage in changing the viewing direction in a mixed resolution viewport dependent 360° streaming schemes.

Subpicture Use Case

Use of a subpicture is required in the viewport dependent 360° scheme providing extended real spatial resolution on the viewport. For example, a scheme in tiles covering the viewport, derived from 6K (6144×3072) ERP (equi rectangular projection) picture or cube map projection (CMP) resolution having 4K decoding performance (HEVC level 5.1) equivalent thereto was included in Sections D.6.3 and D.6.4 of OMAF and was employed in the VR Industry Forum Guideline. Such resolution is known to be suitable for a head mount display using a quad-HD(2560×1440) display panel.

Encoding: Content may be encoded with two spatial resolutions including resolution having a 1656×1536 cube face size and resolution having a 768×768 cube face size. In both bitstreams, a 6×4 tile grid may be used and an MCTS may be coded at each tile position.

Streamed MCTS selection: 12 MCTSs may be selected from a high-resolution bitstream, and 12 additional MCTSs may be obtained from a low-resolution bitstream. Therefore, a hemi-sphere(180°×180° of streamed content may be generated from the high-resolution bitstream.

Decoding using merging of MCTS and bitstream: MCTSs of a single time instance are received, which may be merged into a coded picture having a resolution of 1920×4608 conforming to HEVC level 5.1. In another option for the merged picture, four tile columns have a width value of 768, two tile columns have a width value of 384 and three tile rows have a height value of 768, thereby constructing a picture consisting of 3840×2304 luma samples. Here, the width and height units may be units of the number of luma samples.

Subpicture Signaling

Signaling of a subpicture may be performed at an SPS level as shown in FIG. 8. FIG. 8 shows syntax for signaling a subpicture syntax element in an SPS. Hereinafter, the syntax elements of FIG. 8 will be described.

A syntax element pic_width_max_in_luma_samples may specify a maximum width of each decoded picture referring to an SPS in units of luma samples. The value of pic_width_max_in_luma_samples is greater than 0, and may have a value of an integer multiple of andMinCbSizeY. Here, MinCbSizeY is a variable specifying a minimum size of a luma component coding block.

A syntax element pic_height_max_in_luma_samples may specify a maximum height of each decoded picture referring to an SPS in units of luma samples. pic_height_max_in_luma_samples is greater than 0 and may have a value of an integer multiple of MinCbSizeY.

A syntax element subpic_grid_col_width_minus1 may be used to specify the width of each element of a subpicture identifier grid. For example, subpic_grid_col_width_minus1 may specify the width of each element of the subpicture identifier grid in units of 4 samples, and a value obtained by adding 1 to subpic_grid_col_width_minus1 may specify the width of an individual element of a subpicture identifier grid in units of 4 samples. The length of the syntax element may be a Ceil(Log 2(pic_width_max_in_luma_samples/4)) bit length.

Therefore, a variable NumSubPicGridCols specifying the number of columns in the subpicture grid may be derived as follows.

NumSubPicGridCols=(pic_width_max_in_luma_samples+subpic_grid_col_width_minus1*4+3)/(subpic_grid_col_width_minus1*4+4)  [Equation 1]

A syntax element subpic_grid_row_height_minus1 may be used to specify the height of each element of a subpicture identifier grid. For example, subpic_grid_row_height_minus1 may specify the height of each element of the subpicture identifier grid in units of 4 samples. A value obtained by adding 1 to subpic_grid_row_height_minus1 may specify the height of the individual element of the subpicture identifier grid in units of 4 samples. the length of the syntax element may be a Ceil(Log 2(pic_height_max_in_luma_samples/4)) bit length.

Therefore, a variable NumSubPicGridRows specifying the number of rows in the subpicture gird may be derived as follows.

NumSubPicGridRows=(pic_height_max_in_luma_samples+subpic_grid_row_height_minus1*4+3)/(subpic_grid_row_height_minus1*4+4)  [Equation 2]

A syntax element subpic_grid_idx[i][j] may specify a subpicture index of a grid position (i, j). The length of the syntax element may be Ceil(Log 2(max_subpics_minus1+1)) bits.

A variable SubPicTop[subpic_grid_idx[i][j]], SubPicLeft[subpic_grid_idx[i][j]], SubPicWidth[subpic_grid_idx [i][j]], SubPicHeight[subpic_grid_idx[i][j]] and NumSubPics may be derived as in the algorithm of FIG. 9.

A syntax element subpic_treated_as_pic_flag[i] may specify whether a subpicture is treated as being the same as a normal picture in a decoding process other than an in-loop filtering process. For example, a first value (e.g., 0) of subpic_treated_as_pic_flag[i] may specify that an i-th subpicture of each coding picture in a CVS is not treated as a picture in the decoding process other than the in-loop filtering process. A second value (e.g., 1) of subpic_treated_as_pic_flag[i] may specify that an i-th subpicture of each coding picture in a CVS is treated as a picture in the decoding process other than the in-loop filtering process. When the value of subpic_treated_as_pic_flag[i] is not obtained from the bitstream, the value of subpic_treated_as_pic_flag[i] may be derived as a first value (e.g., 0).

A syntax element loop_filter_across_subpic_enabled_flag[i] may specify whether in-loop filtering is performed across a boundary of an i-th subpicture belonging to an individual coding picture of a CVS. For example, a first value (e.g., 0) of loop_filter_across_subpic_enabled_flag[i] may specify that in-loop filtering is not performed across the boundary of the i-th subpicture belonging to the individual coding picture of the CVS. A second value (e.g., 1) of loop_filter_across_subpic_enabled_flag[i] may specify that in-loop filtering may be performed across the boundary of the i-th subpicture belonging to the individual coding picture of the CVS. When the value of loop_filter_across_subpic_enabled_flag[i] is not obtained from a bitstream, the value of loop_filter_across_subpic_enabled_flag[i] may be derived as a second value.

Meanwhile, for bitstream conformance, the following constraints may apply. For any two subpictures subpicA and subpicB, when the index of subpicA is less than that of subpicB, all coded NAL units of subpicA may have a lower decoding order than all coded NAL units of subpicB. Alternatively, after decoding is performed, the shape of subpictures needs to have a perfect left boundary and a perfect top boundary constructing a picture boundary or a boundary of a previously decoded subpicture.

Overview of Encoding and Decoding Based on Subpicture

The following disclosure relates to encoding/decoding of the above-described picture and/or subpicture. An encoding apparatus may encode a current picture based on a subpicture structure. Alternatively, the encoding apparatus may encode at least one subpicture constructing the current picture and output a (sub)bitstream including (encoded) information on at least one (encoded) subpicture.

The decoding apparatus may decode at least subpicture belonging to the current picture based on the (sub)bitstream including (encoded) information on at least one subpicture.

Figure 10:
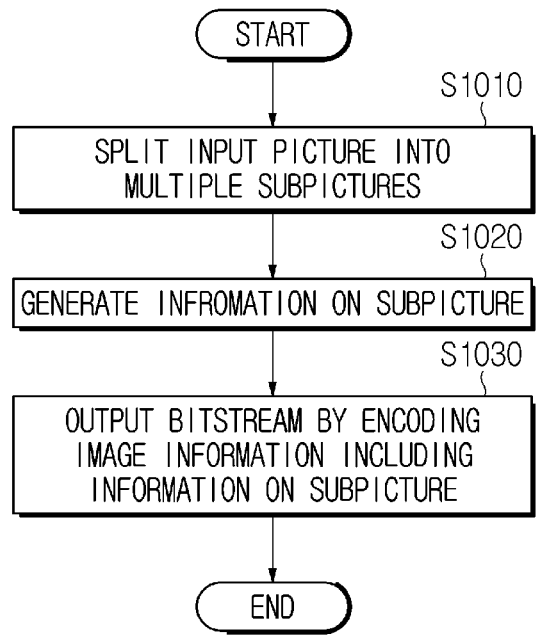
FIG. 10 is a view illustrating a method of encoding an image using a subpicture by an encoding apparatus according to an embodiment.

FIG. 10 is a view illustrating a method of encoding an image using a subpicture by an encoding apparatus according to an embodiment. The encoding apparatus may split an input picture into a plurality of subpictures (S1010). The encoding apparatus may generate information on the subpicture (S1020). The encoding apparatus may encode at least one subpicture using information on the subpicture. For example, each subpicture may be independently separated and encoded using the information on the subpicture. Next, the encoding apparatus may output a bitstream by encoding image information including the information on the subpicture (S1030). Here, the bitstream for the subpicture may be called a substream or a sub-bitstream.

The information on the subpicture will be variously described in the present disclosure, and, for example, there may be information on whether in-loop filtering may be performed across the boundary of the subpicture, information on a subpicture area, information on a grid spacing for using the subpicture, etc.

Figure 11:
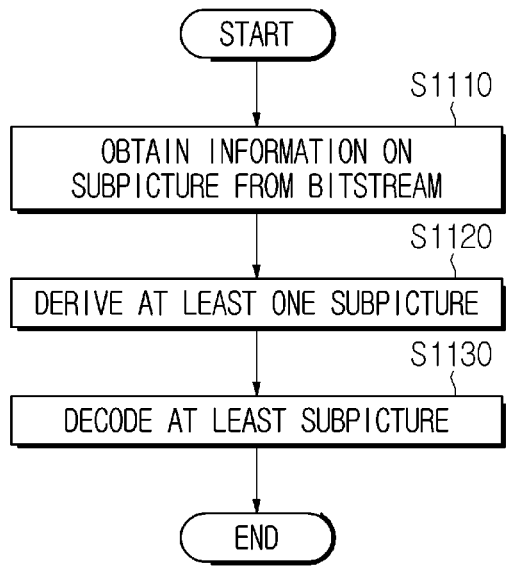
FIG. 11 is a view illustrating a method of decoding an image using a subpicture by a decoding apparatus according to an embodiment.

FIG. 11 is a view illustrating a method of decoding an image using a subpicture by a decoding apparatus according to an embodiment. The decoding apparatus may obtain information on a subpicture from a bitstream (S1110). Next, the decoding apparatus may derive at least one subpicture (S1120) and decode at least one subpicture (S1130).

In this way, the decoding apparatus may decode at least one subpicture and thus output at least one decoded subpicture or a current picture including at least one subpicture. The bitstream may include a substream or a sub-bitstream for the subpicture.

As described above, information on the subpicture may be constructed in an HLS of the bitstream. The decoding apparatus may derive at least one subpicture based on the information on the subpicture. The decoding apparatus may decode the subpicture based on a CABAC method, a prediction method, a residual processing method (transform, quantization), an in-loop filtering method, etc.

When decoded subpicture is output, the decoded subpicture may be output together in the form of an OPS (output sub-picture set). For example, when the current picture is related to 360° or omnidirectional image/video and is partially rendered, only some of the subpictures may be decoded and some or all of the decoded subpictures may be rendered according to the viewport of the user.

When information specifying whether in-loop filtering across the subpicture boundary is available specifies availability, the decoding apparatus may perform in-loop filtering (e.g., deblocking filter) on a subpicture boundary located between two subpictures. Meanwhile, when the subpicture boundary is equal to a picture boundary, an in-loop filtering process for the subpicture boundary may not apply.

Embodiment 1

In the above description, an example of signaling a syntax element of a subpicture at an SPS level has been described. For example, information on a size and position of a subblock may be signaled at an SPS level. Therefore, as shown in the example of FIG. 12, the subpicture may be defined as a set of grid granularities having the same subpicture grid index (e.g., subpic grid index). FIG. 12 shows an embodiment of identifying a size and position of a subpicture using a subpicture grid index defined in an SPS. In FIG. 12, the subpicture grid granularity is indicated by a dotted line, a tile boundary Tile Bdry is indicated by a solid line, and a slice boundary Slice Bdry is indicated by a dashed dotted line.

However, in the example of FIG. 12, a boundary of a subpicture (denoted by a hatching in FIG. 12) defined as a set of grid granularities having a subpicture grid index of 2 has a subpicture boundary which does not coincide with a tile boundary and a slice boundary. The boundary of a subpicture identified according to subpicture grid information provided at the SPS may not coincide with the boundary of a slice and/or tile. Therefore, a slice or tile having a boundary across the boundary of the subpicture may be set.

In this case, as a slice or a tile is determined in a subpicture, there is a problem that the boundary of a tile or a slice may be determined in a form which is not considered during encoding. Alternatively, during encoding and decoding, there is also a problem that a reference to a portion of a slice or a portion of a tile which is not present occurs.

In order to solve the above-described problem, a correspondence relationship between a slice and a subpicture may be signaled at a PPS. Therefore, the subpicture grid may be aligned according to the position of the slice. Therefore, a subpicture syntax may be provided at the PPS instead of the SPS. Hereinafter, a method of signaling an identifier of a subpicture using a PPS will be described.

FIG. 13 is a view illustrating an example of an SPS syntax structure in the present embodiment. In the SPS syntax structure, signaling of at least one syntax element 1310 for a subpicture may be omitted.

Figure 14:
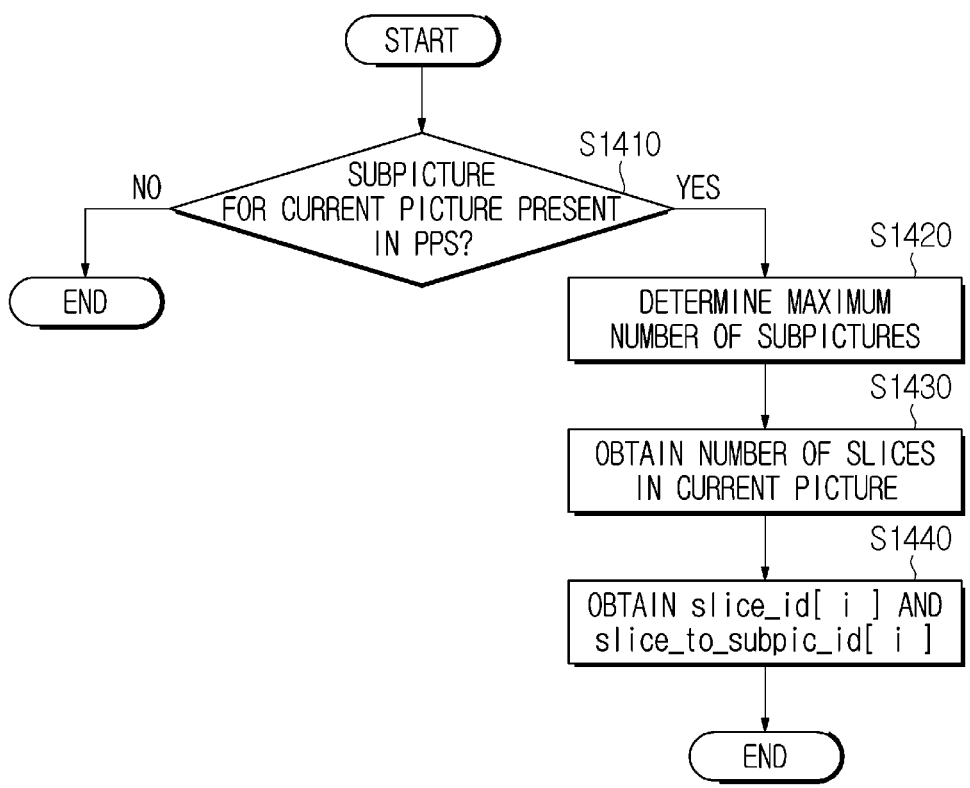
FIG. 14 is a view illustrating a method of identifying a subpicture grid based on a slice by a decoding apparatus according to an embodiment.

FIG. 14 is a view illustrating a method of identifying a subpicture grid based on a slice by a decoding apparatus according to an embodiment. Operation of the decoding apparatus will be described, because an encoding apparatus may generate a bitstream using a method corresponding thereto.

First, the decoding apparatus may determine whether a subpicture for a current picture is present in a PPS (S1410). The decoding apparatus may determine this based on the below-described syntax element pps_subpics_present_flag.

Next, the decoding apparatus may determine a maximum number of subpictures when the subpicture for the current picture is present in the PPS (S1420). The decoding apparatus may determine the maximum number of subpictures based on the below-described syntax element max_subpics_minus1.

Next, the decoding apparatus may determine the number of slices in the current picture (S1430). The decoding apparatus may determine the number of slices in the current picture based on the below-described syntax element num_slices_in_pic_minus1.

Next, the decoding apparatus may determine the ID of a slice belonging to the current picture and the ID of a subpicture corresponding to the slice (S1440). The decoding apparatus may determine the ID of the slice belonging to the current picture and the ID of the subpicture corresponding to the slice based on the below-described syntax elements slice_id[i] and slice_to_subpic_id[i].

FIG. 14 is a view illustrating an example of a PPS syntax structure for subpicture index signaling of FIG. 13. A syntax element pps_subpics_present_flag may specify whether subpicture information of the current picture is present in the PPS. For example, a first value (e.g., 0) of pps_subpics_present_flag may specify that subpicture information of the current picture is not included in the PPS. In this case, only one subpicture may be present in the current picture. A second value (e.g., 1) of pps_subpics_present_flag may specify that subpicture information of the current picture is included in the PPS. In this case, at least one subpicture may be present in the current picture.

When the value of pps_subpics_present_flag is a second value (e.g., 1), a syntax element max_subpics_minus1 may be obtained from a bitstream. max_subpics_minus1 may be used to signal the maximum number of subpictures included in the current picture. For example, the decoding apparatus may determine the maximum number of subpictures included in the current picture to be a value obtained by adding 1 to max_subpics_minus1.

A syntax element rect_slice_flag may specify whether a slice is split in a rectangular shape in the current picture. A first value (e.g., 0) of rect_slice_flag may specify that the slice is split in a raster scan shape. A second value (e.g., 1) of rect_slice_flag may specify that the slice is split in a rectangular shape.

When rect_slice_flag is a second value (e.g., 1), a syntax element num_slices_in_pic_minus1 may be obtained from the PPS. num_slices_in_pic_minus1 may specify a value obtained by subtracting 1 from the number of slices belonging to the current picture. Therefore, the decoding apparatus may determine the number of slices belonging to the current picture to be a value obtained by adding 1 to num_slices_in_pic_minus1.

A syntax element signaled_slice_id_flag may specify whether a slice identifier is explicitly signaled. For example, a first value (e.g., 0) of signaled_slice_id_flag may specify that the slice identifier is not explicitly signaled. A second value (e.g., 1) of signaled_slice_id_flag may specify that the slice identifier is explicitly signaled.

In addition, when the value of pps_subpics_present_flag is a second value (e.g., 1), syntax elements slice_id[i] and slice_to_subpic_id[i] may be obtained from a bitstream. slice_id[i] may specify an identifier of a slice. slice_to_subpic_id[i] may specify a subpicture identifier corresponding to a slice. The length of slice_to_subpic_id[i] may be a Ceil(Log 2(max_sub_pics_minus1+1)) bit length.

By the above processing, a maximum number of subpictures in a sequence and an enabling flag of a subpicture tool may be defined in the PPS. By this processing, it may be assumed that subpictures are not used in a raster scan slice mode and is used only in a rectangular slice mode. In addition, when a flag such as signaled_slice_id_flag is enabled, a slice ID may be explicitly signaled. In order to use presence of the subpicture along with a rectangular slice mode, explicit signaling of a slice ID may be considered. In addition, a new syntax element such as slice_to_subpic_id[i] for matching a slice and a subpicture grid, similar to a syntax element subpic_grid_idx obtained from the SPS, may be further considered.

FIG. 16 is a view illustrating signaling of a syntax element specifying a constraint on the above-described pps_subpics_present_flag. A syntax element no_subpictures_constraint_flag 1610 may be used to signal whether pps_subpics_present_flag is constrained. For example, a first value (e.g., 0) of no_subpictures_constraint_flag may specify that constraint does not apply to the value of pps_subpics_present_flag. A second value (e.g., 1) of no_subpictures_constraint_flag may specify that the value of pps_subpics_present_flag is constrained to a first value (e.g., 0).

Embodiment 2

Subpictures in a picture may have the same width and height. However, in order to increase encoding efficiency, subpictures may have different widths and heights. In order to signal the width and height of the subpicture, subpicture grid information may be signaled.

In an embodiment, the subpicture grid information may be signaled with the uniform width and height. Alternatively, the width and height for each element of the subpicture grid may be explicitly signaled, respectively. Through this, greater flexibility may be proved in the encoding and decoding process using the subpicture.

The encoding apparatus and the decoding apparatus may reduce the amount of bitstreams by using a flag specifying whether a subpicture grid is uniformly signaled. FIG. 17 is a view illustrating an SPS syntax structure for signaling a subpicture grid. Hereinafter, it will be described with reference to FIG. 17.

A syntax element subpics_present_flag may specify whether a subpicture parameter is provided in a current SPS RBSP syntax. For example, a first value (e.g., 0) of subpics_present_flag may specify that the subpicture parameter is not provided in the current SPS RBSP syntax. A second value (e.g., 1) of subpics_present_flag may specify that the subpicture parameter is provided in the current SPS RBSP syntax.

Meanwhile, when a bitstream is generated by a sub-bitstream acquisition process and the bitstream includes only a subpicture subset of an input bitstream for the sub-bitstream acquisition process, the value of subpics_present_flag may be set to 1 in RVSP for SPSs.

A syntax element max_subpics_minus1 may specify a value obtained by subtracting 1 from a maximum number of subpictures provided in a current encoded image sequence. For example, the value obtained by adding 1 to max_subpics_minus1 may specify a maximum number of subpictures. max_subpics_minus1 may have a value of 0 to 254.

A syntax element uniform_subpic_grid_flag may specify whether a subpicture grid is uniformly distributed on a picture. Furthermore, uniform_subpic_grid_flag may specify that syntax elements subpic_grid_col_width_minus1 and subpic_grid_row_height_minus1 are signaled.

For example, a first value (e.g., 0) of uniform_subpic_grid_flag may specify that a subpicture column boundary and a subpicture row boundary may not be uniformly distributed on a picture. Furthermore, a first value (e.g., 0) of uniform_subpic_grid_flag may further specify that syntax elements num_subpic_grid_col_minus1 and num_subpic_grid_row_minus1 and syntax elements subpic_grid_row_height_minus1[i] and subpic_col_width_minus1[i] which are lists of pairs of syntax elements are signaled.

Meanwhile, a second value (e.g., 1) of uniform_subpic_grid_flag may specify that a subpicture column boundary and a subpicture row boundary are uniformly distributed on the picture. Further, uniform_subpic_grid_flag may specify that syntax elements subpic_grid_col_width_minus1 and subpic_grid_row_height_minus1 are signaled.

When the value of uniform_subpic_grid_flag is not obtained from the bitstream, the value of uniform_subpic_grid_flag may be derived as 1.

A syntax element subpic_grid_col_width_minus1 may specify the width of an individual element in the subpicture identifier grid. For example, a value obtained by adding 1 to subpic_grid_col_width_minus1 may specify the width of the individual element in the subpicture identifier grid in units of 4 samples. subpic_grid_col_width_minus1 may have a Ceil(Log 2(pic_width_max_in_luma_samples/4)) bit length. Meanwhile, when the value of uniform_subpic_grid_flag is a second value (e.g., 1), the value of a variable NumSubPicGridCols specifying the number of subpicture grid columns may be derived as follows.

$$\text{NumSubPicGridCols} = (pic\_width\_max\_in\_luma\_samples + subpic\_grid\_col\_width\_minus1*4+3)/(subpic\_grid\_col\_width\_minus1*4+4) \quad \text{[Equation 3]}$$

A syntax element subpic_grid_row_height_minus1 may specify the height of the individual element in the subpicture identifier grid. For example, the value obtained by adding 1 to subpic_grid_row_height_minus1 may specify the height of the individual element in the subpicture identifier grid in units of 4 samples. subpic_grid_row_height_minus1 may have a Ceil(Log 2(pic_height_max_in_luma_samples/4)) bit length. Meanwhile, when the value of uniform_subpic_grid_flag is a second value (e.g., 1), the value of a variable NumSubPicGridRows specifying the number of subpicture grid rows may be derived as follows.

$$\text{NumSubPicGridRows} = (pic\_height\_max\_in\_luma\_samples + subpic\_grid\_row\_height\_minus1*4+3)/(subpic\_grid\_row\_height\_minus1*4+4) \quad \text{[Equation 4]}$$

A syntax element num_subpic_grid_col_minus1 may be used to signal the value of NumSubPicGridCols. For example, the value obtained by adding 1 to num_subpic_grid_col_minus1 may specify the value of NumSubPicGridCols.

A syntax element num_subpic_grid_row_minus1 may be used to signal the value of NumSubPicGridRows. For example, the value obtained by adding 1 to num_subpic_grid_row_minus1 may specify the value of NumSubPicGridRows.

A syntax element subpic_grid_idx[i][j] may specify a subpicture index at a grid position (i, j). subpic_grid_idx[i][j] may have a Ceil(Log 2(max_subpics_minus1+1)) bit length.

Variables SubPicTop[subpic_grid_idx[i][j]], SubPicLeft[subpic_grid_idx[i][j]], SubPicWidth[subpic_grid_idx[i][j]], SubPicHeight[subpic_grid_idx[i][j]] and NumSubPics may be derived using the algorithm of FIG. 9.

A syntax element subpic_treated_as_pic_flag[i] may be used to specify whether an i-th subpicture of an individual coding picture in a coded image sequence is treated like a picture in a decoding process except for an in-loop filtering process. For example, a first value (e.g., 0) of subpic_treated_as_pic_flag[i] may specify that the i-th subpicture of the individual coding picture in the coded image sequence is not treated like the picture in the decoding process except for the in-loop filtering process.

A second value (e.g., 1) of subpic_treated_as_pic_flag[i] may specify that the i-th subpicture of the individual coding picture in the coded image sequence is treated like the picture in the decoding process except for the in-loop filtering process.

When subpic_treated_as_pic_flag[i] is not obtained from the bitstream, the value of subpic_treated_as_pic_flag[i] may be derived as a first value.

A syntax element loop_filter_across_subpic_enabled_flag[i] may be used to specify whether in-loop filtering operation is performed across the boundary of the i-th subpicture belonging to the individual coding picture of the coded image sequence.

For example, the first value (e.g., 0) of loop_filter_across_subpic_enabled_flag[i] may specify that in-loop filtering operation is not performed across the boundary of the i-th subpicture belonging to the individual coding picture of the coded image sequence.

A second value (e.g., 1) of loop_filter_across_subpic_enabled_flag[i] may specify that in-loop filtering operation is performed across the boundary of the i-th subpicture belonging to the individual coding picture of the coded image sequence.

When loop_filter_across_subpic_enabled_flag[i] is not obtained from the bitstream, the value of loop_filter_across_subpic_enabled_flag[i] may be derived as a second value.

In order to comply with bitstream conformance, the following constraints may apply. For any two subpictures subpicA and subpicB, when the index of subpicA is less than that of subpicB, all coded NAL units of subpicA may have a lower decoding order than all coded NAL units of subpicB. In addition, after decoding is performed, the shape of subpictures needs to have a perfect left boundary and a perfect top boundary constructing a picture boundary or a boundary of a previously decoded subpicture.

Meanwhile, variables SubPicIdx, SubPicLeftBoundaryPos, SubPicTopBoundaryPos, SubPicRightBoundaryPos, and SubPicBotBoundaryPos may be derived based on the value of uniform_subpic_grid_flag according to the algorithm of FIG. 18.

In addition, a list CtbToSubPicIdx[ctbAddrRs] specifying a subpicture index for a CTB address ctbAddrRs according to the raster scan order of the picture may be derived based on the value of uniform_subpic_grid_flag according to the algorithm of FIG. 19. Here, ctbAddrRs may have a value of 0 to PicSizeInCtbsY−1.

Embodiment 3

In the above-described embodiment, a subpicture grid may have 4-pixel resolution. The following table shows storage cost in the subpicture grid using 4-sample resolution.

TABLE 2

| Video Resolution | Worst Case Memory Requirement per SPS |
|---|---|
| 4K (4096 × 2160) | 8 bits for grid_idx<br>552, 960 elements<br>553 kB |
| 8K (8192 × 4320) | 8 bits for the grid_idx<br>2,211,840 elements<br>2.21 MB |

As shown in in the above table, a 553-kB memory is required to allocate a subpicture grid in a 4K video sequence. Similarly, when resolution increases to 8K, the worst case memory requirement increases to 2.21 MB. In the present embodiment, a new syntax element used to control a grid size is disclosed. FIG. 20 shows an SPS syntax according to an embodiment. As shown in the example of FIG. 20, a syntax element grid_spacing may be added to the SPS syntax.

A syntax element grid_spacing_minus4 2010 may be used to specify a grid spacing value. For example, a value obtained by adding 4 to grid_spacing_minus4 may specify a gird spacing for the current subpicture grid.

Therefore, the above-described NumSubPicGridCols may be derived as follows.

$$\text{NumSubPicGridCols}=(pic\_width\_max\_in\_luma\_samples+subpic\_grid\_col\_width\_minus1*4+3)/(subpic\_grid\_col\_width\_minus1*(grid\_spacing\_minus4+4)+4) \quad \text{[Equation 5]}$$

In addition, the above-described NumSubPicGridRows may be derived as follows.

$$\text{NumSubPicGridRows}=(pic\_height\_max\_in\_luma\_samples+subpic\_grid\_row\_height\_minus1*4+3)/(subpic\_grid\_row\_height\_minus1*(grid\_spacing\_minus4+4)+4) \quad \text{[Equation 6]}$$

By limiting the grid spacing as described above, the memory in the worst case may be more efficiently controlled. The above-described embodiment corresponds to a case where the value of a minimum grid spacing to be used is 4, but the scope of the present disclosure is not limited thereto. For example, SPS syntax signaling for a case where the minimum grid spacing is 8, 16, 32, 64 or even CTU may be performed. For this, an expression such as grid_spacing_minusx may be used to denote the above-described syntax element grid_spacing. Here, 'x' may be 8, 16, 32, 64, 128 and/or any other value.

As such, in order to obtain greater flexibility in the subpicture design, a user-defined grid spacing may be supported. In this case, in order to control the worst case memory requirements, a constraint may apply such that a user-defined grid spacing size is equal to or greater than a minimum grid spacing size.

In this regard, a constraint (e.g., grid_spacing_minusx) on the syntax element may apply as follows. In order to signal the minimum grid spacing, a syntax element grid_spacing_minus8 for signaling a value obtained by subtracting 8 from the minimum grid spacing may be used. In a similar manner, a syntax element grid_spacing_minus16 for signaling a value obtained by subtracting 16 from the minimum grid spacing may be used, a syntax element grid_spacing_minus32 for signaling a value obtained by subtracting 32 from the minimum grid spacing may be used, a syntax element grid_spacing_minus64 for signaling a value obtained by subtracting 64 from the minimum grid spacing may be used or a syntax element grid_spacing_minus128 for signaling a value obtained by subtracting 128 from the minimum grid spacing may be used.

The following table shows memory load according to the grid spacing size. In the following table, it is observed that the memory load decreases as the grid spacing increases. This is more conspicuous when resolution increases.

TABLE 3

| Grid Spacing | 4K (4096 × 2160) | 8K (8192 × 4320) |
|---|---|---|
| 4 × 4 | 553 kB | 2.21 MB |
| 8 × 8 | 138 kB | 553 kB |
| 16 × 16 | 34 kB | 138 kB |
| 32 × 32 | 8.6 kB | 34 kB |
| 64 × 64 | 2.2 kB | 8.6 kB |
| 128 × 128 | 0.5 kB | 2.2 kB |

Embodiment 4

In the above-described embodiment of FIG. 9, when the width and height of the subpicture are 1, the last column of the subpicture and the width and height of the last column and row of the subpicture are not clearly generated. Therefore, the present embodiment discloses modifications of SubPicHeight and SubPicWidth for clearly generating the width and height of the subpicture.

A changed algorithm therefor is shown in FIG. 21. According to FIG. 21, by calculating SubPicHeight and SubPicWidth, the area of the subpicture may be more accurately calculated.

Embodiment 5

In Embodiment 2 above, a method of modifying a grid spacing for a subpicture to provide greater flexibility to enable easier signaling of large subpictures is disclosed.

In the present disclosure, a method of signaling a ununiform subpicture grid is disclosed. Making subpicture grid information unform or ununiform may be more efficient in that it may be more aligned to the tile structure of the PPS and fewer subpicture grid indices than the large subpicture are signaled.

Hereinafter, only changes compared to Embodiment 2 above will be described. The SPS syntax according to FIG. 17 may be modified as shown in FIG. 22. In the syntax of FIG. 22, a syntax element subpic_grid_rows_height_minus1 [i] may be used to specify the height of an i-th row of the subpicture grid element. For example, a value obtained by adding 1 to subpic_grid_rows_height_minus1 [i] may specify the height of an i-th row. A syntax element subpic_grid_cols_width_minus1[i] may be used to specify the width of an i-th column of the subpicture grid element. For example, a value obtained by adding 1 to subpic_grid_cols_width_minus1 [i] may specify the width of the i-th column.

When the value of uniform_subpic_grid_flag is a first value (e.g., 0) specifying that the width and height of the subpicture grid element are not uniform, the individual width and height of the subpicture grid element may be signaled by subpic_grid_cols_width_minus1 [i] and subpic_grid_rows_height_minus1[i]. In addition, when the value of uniform_subpic_grid_flag is a second value (e.g., 1) specifying that the width and height of the subpicture grid element are uniform, the individual width and height of the subpicture grid element may be signaled by subpic_grid_col_width_minus1 and subpic_grid_row_height_minus1.

As the expression of the syntax element is changed according to the value of uniform_subpic_grid_flag, variables SubPicIdx, SubPicLeftBoundaryPos, SubPicTopBoundaryPos, SubPicRightBoundaryPos, and SubPicBotBoundaryPos may be derived according to the algorithm of FIG. 23, and a list CtbToSubPicIdx[ctbAddrRs] specifying a subpicture index for a CTB address ctbAddrRs according to the raster scan order of the picture may be derived according to the algorithm of FIG. 24.

Encoding and Decoding Method

Hereinafter, an image decoding method performed by an image decoding apparatus will be described with reference to FIG. 25. The image decoding apparatus according to an embodiment may include a memory and a processor, and the processor may perform the following operation.

First, the decoding apparatus may obtain, from a picture parameter set, a first signaling flag (e.g., pps_subpics_present_flag in a PPS) specifying whether an identifier of a subpicture splitting a current picture is signaled using the picture parameter set (S2510).

Next, when the first signaling flag specifies that the identifier of the subpicture is signaled using the picture parameter set, the decoding apparatus may obtain identifier information (e.g., slice_to_subpic_id[i]) of a subpicture from the picture parameter set (S2520).

More specifically, identifier number information (e.g., num_slices_in_pic_minus1) specifying the number of subpicture identifier information obtained from the picture parameter set may be obtained from the picture parameter set. In addition, the decoding apparatus may obtain subpicture identifier information from the picture parameter set based on the identifier number information. The identifier number information may specify a value obtained by subtracting 1 from the number of subpicture identifier information obtained from the picture parameter set.

Next, the decoding apparatus may decode a current picture by decoding a current subpicture identified based on the identifier information (S2530).

Meanwhile, a subpicture constraint flag may be obtained from a bitstream. When the subpicture constraint flag specifies that the value of a subpicture signaling flag is constrained to a predetermined value, the decoding apparatus may determine the value of the subpicture signaling flag to be a value specifying that the identifier of the subpicture is not signaled using the picture parameter set.

In addition, the decoding apparatus may obtain, from a sequence parameter set, a second signaling flag (e.g., subpics_present_flag in an SPS) specifying whether the identifier of the subpicture splitting the current picture is signaled using the sequence parameter set.

In addition, when the second signaling flag specifies that the identifier of the subpicture is signaled using the sequence parameter set, the decoding apparatus may obtain size number information (e.g., num_subpic_grid_col_minus1, num_subpic_grid_row_minus1) specifying the number of size information of subpictures included in the sequence parameter set. The size number information may be obtained from the sequence parameter set, when the width of the subpicture is not uniformly determined (e.g., uniform_subpic_grid_flag==0). In addition, the size information may be obtained from the sequence parameter set by the number identified according to the size number information.

More specifically, the size information may include width information (e.g., subpic_grid_col_width_minus1[i]) and height information (e.g., subpic_grid_row_height_minus1 [i]) of the subpicture. The width of the subpicture may be obtained for at least one subpicture dividing the width of the current picture. In addition, the height of the subpicture may be obtained for at least one subpicture dividing the height of the current block. Meanwhile, when the width of the subpicture is uniformly determined (e.g., uniform_subpic_grid- _flag==1), one size information may be obtained for each of the width and the height (e.g., subpic_grid_col_width_minus1, subpic_grid_row_height_minus1).

Therefore, the decoding apparatus may obtain the size information of the subpicture from the sequence parameter set based on the size number information.

In addition, the decoding apparatus may determine the size of the subpicture based on size information and spacing information obtained from the sequence parameter set. Here, the spacing information may specify a sample unit of a value specified by the size information. A sample unit specified by the spacing information may have a sample unit greater than a 4-sample unit.

Figure 26:
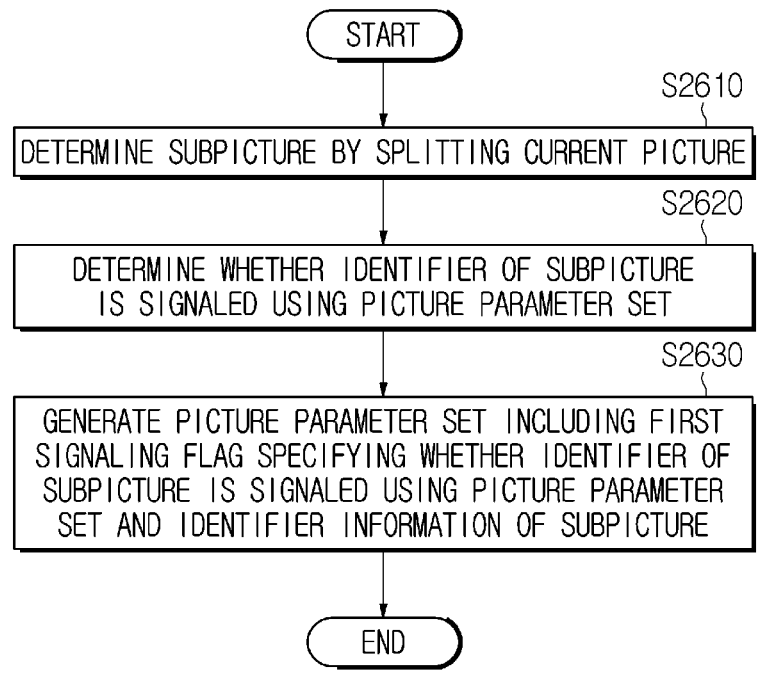

Hereinafter, an image encoding method performed by an image encoding apparatus will be described with reference to FIG. 26. The image encoding apparatus according to an embodiment may include a memory and a processor, and the processor may perform operation corresponding to operation of the above-described decoding apparatus.

For example, the encoding apparatus may determine a subpicture by splitting a current picture (S2610). Next, the encoding apparatus may determine whether an identifier of the subpicture is signaled using a picture parameter set (S2620). Next, when the identifier of the subpicture is signaled using the picture parameter set, the encoding apparatus may generate the picture parameter set including a first signaling flag pps_subpics_present_flag specifying that the identifier of the subpicture is signaled using the picture parameter set and identifier information slice_to_subpic_id [i] of the subpicture (S2630).

More specifically, the encoding apparatus may generate a picture parameter set including identifier number information (e.g., num_slices_in_pic_minus1) specifying the number of subpicture identifier information included in the picture parameter set along with the subpicture identifier information. The identifier number information may specify a value obtained by subtracting 1 from the number of subpicture identifier information obtained from the picture parameter set.

Meanwhile, the encoding apparatus may generate a bitstream including a subpicture constraint flag. The encoding apparatus may set a value of the subpicture constraint flag to have a value specifying that the value of the subpicture signaling flag is constrained to a predetermined value. For example, the encoding apparatus may set the value of the subpicture signaling flag to a value specifying that the identifier of the subpicture is not signaled using the picture parameter set.

In addition, the encoding apparatus may generate a sequence parameter set including a second signaling flag (e.g., subpics_present_flag in an SPS) specifying whether the identifier of the subpicture splitting the current picture is signaled using the sequence parameter set.

In addition, the encoding apparatus may further include size number information specifying the number of size information of the subpicture in the sequence parameter set. When the width of the subpicture is not uniformly determined, the size number information may be included in the sequence parameter set. More specifically, the size information may include width information and height information of the subpicture. The width of the subpicture may be included in the sequence parameter set for at least one subpicture dividing the width of the current picture. In addition, the height of the subpicture may be included in the sequence parameter set for at least one subpicture dividing the height of the current picture. Meanwhile, when the width of the subpicture is uniformly determined, only one size information may be included in the sequence parameter set for each of the width and the height.

In addition, the encoding apparatus may signal size information and spacing information using the sequence parameter set in order to signal the size of the subpicture. Here, the spacing information may specify a sample unit of a value specified by the size information. A sample unit specified by the spacing information may have a sample unit greater than a 4-sample unit.

Application Embodiment

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 27:
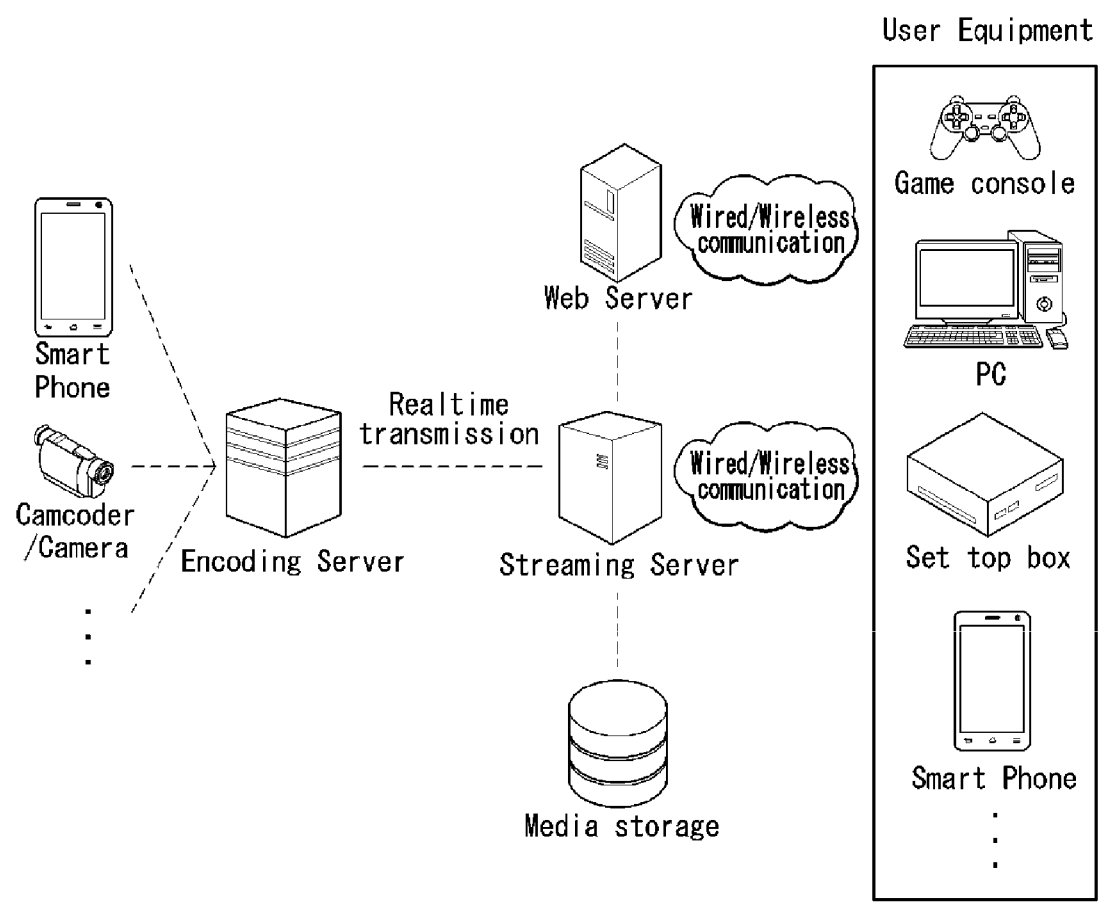
FIG. 27 is a view showing a content streaming system, to which an embodiment of the present disclosure is applicable.

FIG. 27 is a view showing a contents streaming system, to which an embodiment of the present disclosure is applicable.

As shown in FIG. 27, the contents streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
    parsing a first signaling flag from a picture parameter set, wherein the first signaling flag specifies whether an identifier of a subpicture included in a current picture is parsed from the picture parameter set;
    parsing subpicture identifier information of the subpicture from the picture parameter set based on the first signaling flag specifying that the identifier of the subpicture is parsed from the picture parameter set; and
    decoding the current picture by decoding a current subpicture identified based on the subpicture identifier information,
    wherein identifier number information for specifying a number of pieces of the subpicture identifier information is parsed from the picture parameter set,
    wherein the subpicture identifier information is parsed from the picture parameter set further based on the identifier number information, and
    wherein the image decoding method further comprises:
        parsing a second signaling flag from a sequence parameter set, wherein the second signaling flag specifies whether information of the subpicture is parsed from the sequence parameter set;
        parsing size number information for specifying a number of pieces of size information of the subpicture based on the second signaling flag specifying that the information of the subpicture is parsed from the sequence parameter set; and
        parsing the size information explicitly indicating a size of the subpicture based on the size number information,
        wherein, based on subpictures included in the current picture not being uniform, two or more pieces of the size information are parsed, and
        wherein the size information is parsed from the sequence parameter set.

2. The image decoding method of claim 1,
    wherein a subpicture constraint flag is parsed from a bitstream, and
    wherein, based on the subpicture constraint flag specifying that a value of the subpicture signaling flag is constrained to a predetermined value, the subpicture signaling flag is determined to be a value specifying that the identifier of the subpicture is not parsed from the picture parameter set.

3. An image encoding method performed by an image encoding apparatus, the image encoding method comprising:
    determining a subpicture by splitting a current picture;
    determining whether an identifier of the subpicture is encoded into a picture parameter set; and
    generating a picture parameter set comprising a first signaling flag specifying whether the identifier of the subpicture is encoded into the picture parameter set and subpicture identifier information of the subpicture, based on the identifier of the subpicture being encoded into the picture parameter set,
    wherein identifier number information for specifying a number of pieces of the subpicture identifier information is encoded into the picture parameter set,
    wherein the subpicture identifier information is encoded into the picture parameter set further based on the identifier number information, and
    wherein the image encoding method further comprises:
        determining whether information of the subpicture is encoded into a sequence parameter set;
        determining a number of pieces of size information of the subpicture based on the information of the subpicture being encoded into the sequence parameter set; and
        encoding the size information explicitly indicating a size of the subpicture based on the number of pieces of the size information, wherein a second signaling flag specifying whether the information of the subpicture is encoded into the sequence parameter set and size number information of the subpicture specifying the number of pieces of the size information are encoded into the sequence parameter set, and wherein, based on subpictures included in the current picture not being uniform, two or more pieces of the size information are encoded, and wherein the size information is encoded into the sequence parameter set.

4. A method of transmitting a bitstream generated by an image encoding method, the method comprising:

determining a subpicture by splitting a current picture;

determining whether an identifier of the subpicture is encoded into a picture parameter set;

generating a picture parameter set comprising a first signaling flag specifying whether the identifier of the subpicture is encoded into the picture parameter set and subpicture identifier information of the subpicture, based on the identifier of the subpicture being encoded into the picture parameter set; and transmitting the bitstream, the bitstream including the picture parameter set, wherein identifier number information for specifying a number of pieces of the subpicture identifier information is encoded into the picture parameter set, wherein the subpicture identifier information is encoded into the picture parameter set further based on the identifier number information, and wherein the image encoding method further comprises:

determining whether information of the subpicture is encoded into a sequence parameter set;

determining a number of pieces of size information of the subpicture based on the information of the subpicture being encoded into the sequence parameter set; and encoding the size information explicitly indicating a size of the subpicture based on the number of pieces of the size information, wherein a second signaling flag specifying whether the information of the subpicture is encoded into the sequence parameter set and size number information of the subpicture specifying the number of pieces of the size information are encoded into the sequence parameter set, and wherein, based on subpictures included in the current picture not being uniform, two or more pieces of the size information are encoded, and wherein the size information is encoded into the sequence parameter set.

* * * * *